(12) United States Patent
Hwang et al.

(10) Patent No.: US 10,642,749 B2
(45) Date of Patent: May 5, 2020

(54) ELECTRONIC DEVICE AND METHOD FOR MANAGING MEMORY THEREOF

(71) Applicant: Samsung Electronics Co., Ltd., Suwon-si, Gyeonggi-do (KR)

(72) Inventors: Chanyoung Hwang, Seoul (KR); Soonwan Kwon, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1 day.

(21) Appl. No.: 15/771,363

(22) PCT Filed: Oct. 20, 2016

(86) PCT No.: PCT/KR2016/011835
§ 371 (c)(1),
(2) Date: Jul. 3, 2018

(87) PCT Pub. No.: WO2017/073957
PCT Pub. Date: May 4, 2017

(65) Prior Publication Data
US 2018/0314644 A1    Nov. 1, 2018

(30) Foreign Application Priority Data

Oct. 27, 2015 (KR) .......................... 10-2015-0149196

(51) Int. Cl.
*G06F 12/10* (2016.01)
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 2212/1044* (2013.01); *G06F 2212/657* (2013.01); *G06F 2212/68* (2013.01)

(58) Field of Classification Search
CPC ............. G06F 12/1009; G06F 12/1027; G06F 2212/1044; G06F 2212/657; G06F 2212/68
(Continued)

(56) References Cited

U.S. PATENT DOCUMENTS

| | | | |
|---|---|---|---|
| 7,797,510 B1 | 9/2010 | Case et al. | |
| 8,443,167 B1* | 5/2013 | Fallone | G06F 12/0246 |
| | | | 711/206 |

(Continued)

FOREIGN PATENT DOCUMENTS

| | | |
|---|---|---|
| KR | 10-2008-0045556 A | 5/2008 |
| KR | 10-1533744 B1 | 7/2015 |

OTHER PUBLICATIONS

ISA/KR, "International Search Report and Written Opinion of the International Searching Authority," International Application No. PCT/KR2016/011835, 12 pages.

*Primary Examiner* — Gary J Portka

(57) ABSTRACT

An electronic device and a method for managing memory thereof are disclosed. According to an embodiment of the present disclosure, a method for an electronic device to manage memory, comprising: determining whether a physical address mapped to a virtual address is consecutive with respect to at least two entries belonging to a plurality of entries having virtual addresses and physical addresses mapped and including a consecutive virtual address; merging entries in which the virtual address and the physical address are consecutive into one entry if, as a result of the determination, the physical addresses of the at least entries are consecutive; and storing the merged entry in first memory.

15 Claims, 22 Drawing Sheets

(58) Field of Classification Search
USPC .................................. 711/205, 206, 207, 209
See application file for complete search history.

(56) References Cited

U.S. PATENT DOCUMENTS

| | | | |
|---|---|---|---|
| 8,601,223 B1* | 12/2013 | Yuan | G06F 12/1027 345/535 |
| 8,880,784 B2* | 11/2014 | Chiueh | G06F 12/0246 711/103 |
| 2008/0120488 A1 | 5/2008 | Woo et al. | |
| 2008/0215815 A1 | 9/2008 | Dombrowski et al. | |
| 2010/0100667 A1 | 4/2010 | Kang et al. | |
| 2012/0246436 A1 | 9/2012 | Wang et al. | |
| 2015/0089116 A1 | 3/2015 | Chin et al. | |

* cited by examiner

FIG. 11

|  | 4K | 8K | 16K | 64K |
|---|---|---|---|---|
| Hit Count | $HC_0$ | $HC_1$ | $HC_2$ | $HC_3$ |
| Access Count | $AC_0$ | $AC_1$ | $AC_2$ | $AC_3$ |

ELECTRONIC DEVICE AND METHOD FOR MANAGING MEMORY THEREOF

CROSS-REFERENCE TO RELATED APPLICATIONS AND CLAIM OF PRIORITY

This application is a 371 National Stage of International Application No. PCT/KR2016/011835, filed on Oct. 20, 2016, which claims priority to Korean Patent Application No. KR 10-2015-0149196, filed on Oct. 27, 2015, the disclosures of which are herein incorporated by reference in their entirety.

TECHNICAL FIELD

The present disclosure relates to an electronic device and a method for the electronic device to manage memory. More specifically, the present disclosure proposes an electronic device for efficiently converting a virtual address of a memory page into a physical address and a method for the electronic device to manage memory.

BACKGROUND

In general, an electronic device may manage memory using a virtual memory scheme. The virtual memory scheme means a method using a memory address and actual memory address used by an electronic device by separating them. For example, the virtual memory scheme is implemented by a paging scheme for dividing the entire memory into pages of a specific size and associating a virtual address and a physical address in a page unit.

A memory management unit (MMU) is located inside or outside a processor, and converts a virtual address into a physical address whenever the processor accesses memory. The MMU manages the virtual address and the physical address in a special region of the memory in the form of a page table by mapping the virtual address and the physical address in a page unit. The MMU accesses the memory in order to identify a mapping relation for an address conversion relation. In this case, in order to reduce generated latency, memory of a cache structure called a translation lookaside buffer (TLB) is separately used in the MMU. If the associative relation between the virtual page and the physical page is identified in a TLB, that is, when a TLB Hit is generated, the MMU may converts the addresses without accessing the page table, and this has a great influence on performance.

Recently, the MMU's access to the memory increases as the amount of data to be processed in an electronic device, such as an increase of resolution of an image used, increases. Accordingly, the size of a TLB within the MMU necessary for an address conversion process has also increased.

If many processors or master IPs within the electronic device include a TLB having a large size, however, a large space is necessary and consumption power also increases.

In order to solve such a problem, the mapping number of virtual addresses and physical addresses may be reduced by increasing a page unit. However, the page unit cannot be increased for use of a current operating system and memory of other applications.

Accordingly, the necessity of reviewing a technology capable of having an effect in that the size of a TLB is maintained and a page unit is used like a large page unit has emerged.

SUMMARY

The present disclosure provides an electronic device for performing address conversion without performance degradation using a small TLB through an effect, such as that obtained using more TLB entries while using a limited number of TLB entries without changing the size of a page, that is, a management unit of memory, and a method for the electronic device to manage memory.

A method for an electronic device to manage memory according to an embodiment of the present disclosure may include determining whether a physical address mapped to a virtual address is consecutive with respect to at least two entries belonging to a plurality of entries having virtual addresses and physical addresses mapped and including a consecutive virtual address, merging entries in which the virtual address and the physical address are consecutive into one entry if as a result of the determination, the physical addresses of the at least two entries are consecutive and storing the merged entry in first memory.

Meanwhile, an electronic device according to an embodiment of the present disclosure may include first memory storing an entry and a controller configured to determine whether a physical address mapped to a virtual address is consecutive with respect to at least two entries belonging to a plurality of entries in which virtual addresses and physical addresses have been mapped and including a consecutive virtual address, to merge entries in which the virtual address and the physical address are consecutive into one entry if, as a result of the determination, the physical addresses of the at least two entries are consecutive, and to control to store the merged entry in the first memory.

In accordance with an embodiment of the present disclosure, a virtual address of a memory page can be efficiently converted into a physical address while using a limited number of entries in each of which a virtual address and a physical address have been mapped without changing the size of a memory page.

BRIEF DESCRIPTION OF THE DRAWINGS

FIG. 11 is a diagram showing a hit monitor according to an embodiment of the present disclosure.

DETAILED DESCRIPTION

Figure 1:
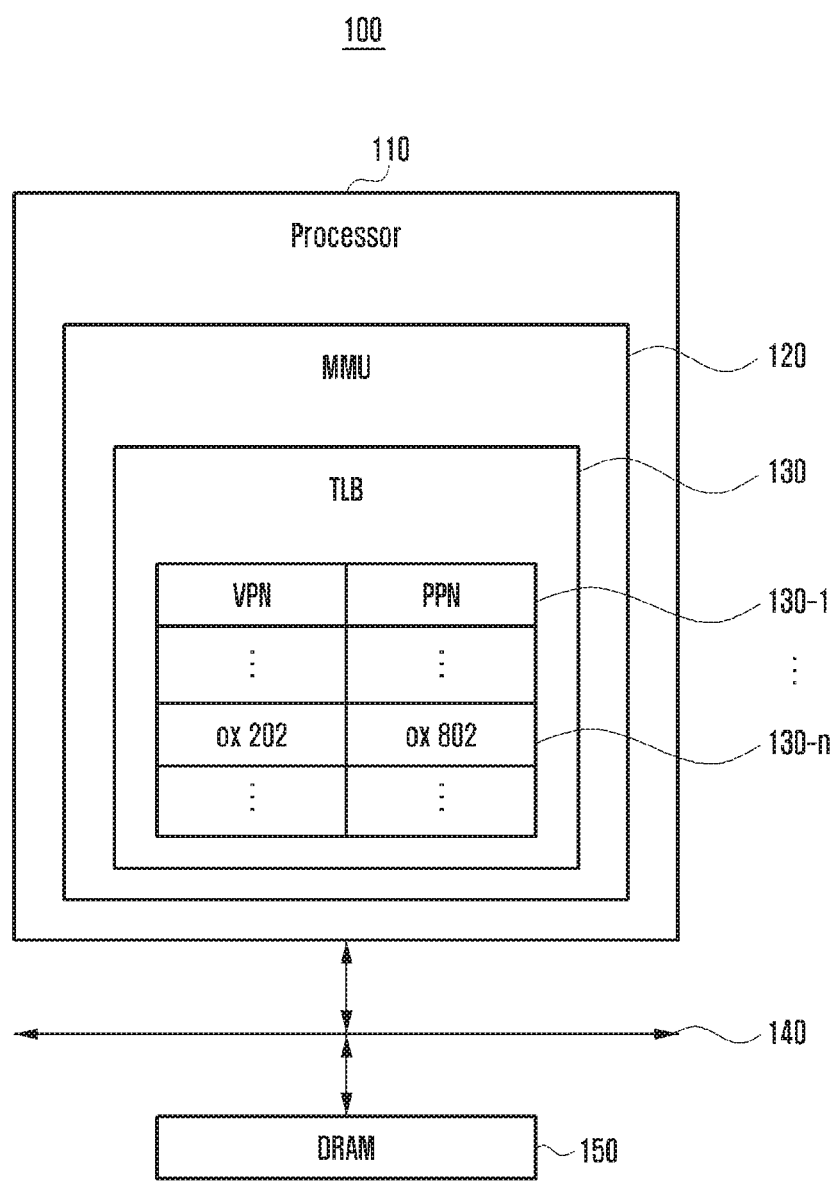
FIG. 1 is a diagram showing an electronic device according to an embodiment of the present disclosure.

The present embodiments may be modified in various ways and may have several embodiments. Specific embodiments are to be illustrated in the drawings and to be described the detailed description. It is however to be understood that the scope is not intended to be limited to specific embodiments, but that the specific embodiments include all of modifications, equivalents and/or substitutions included in the disclosed spirit and technological scope. In describing the embodiments, a detailed description of the known technologies will be omitted if it is deemed to make the gist unnecessarily vague.

Terms, such as the first and the second, may be used to describe various elements, but the elements should not be restricted by the terms. The terms are used to only distinguish one element from the other element.

The terms used in this application are used to describe specific embodiments only and are not intended to restrict the scope of right. An expression of the singular number includes an expression of the plural number unless clearly defined otherwise in the context. In this application, terms, such as "include" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

In the embodiments, a "module" or "unit" performs at least one function or operation and may be implemented by hardware or software or a combination of hardware and software. Furthermore, a plurality of "modules" or a plurality of "units" may be integrated into at least one module other than a "module" or "unit" that may need to be implemented as a piece of specific hardware and may be implemented as at least one processor (not shown).

FIG. 1 is a diagram showing an electronic device 100 according to an embodiment of the present disclosure. The electronic device 100 shown in FIG. 1 may be a separate electronic device, but may be a device included in another electronic device in order to convert a virtual address of a memory page into a physical address.

A page is a consecutive interval having a fixed length in a virtual address space, and means a basic unit that forms a virtual address space. In general, a page may have a length of 4 KB.

As shown in FIG. 1, a processor 110 using a virtual address may include a memory management unit (MMU) 120 generally managing memory in order to convert a virtual address into a physical address.

However, this is only an embodiment. The MMU 120 may be applied to a master IP mounted on an application processor (AP). For example, the MMU 120 may be present between a master IP and an interconnector so that a corresponding IP uses address spaces consecutive in a virtual address space.

Accordingly, in the present disclosure, the MMU 120 may be implemented as an embodiment in which the MMU is located inside an IP, an embodiment in which the MMU is located outside an IP, and an embodiment in which the MMU is located outside an IP and shared by a plurality of IPs.

A translation lookaside buffer (TLB) 130 is memory capable of storing conversion information for converting a virtual address into a physical address. The TLB 130 may be included in the MMU 120.

The TLB 130 may store entries 130-1, . . . , 130-$n$, . . . in each of which a virtual page number (VPN) for a virtual address and a physical page number (PPN) for a physical address have been mapped.

Accordingly, if the MMU 120 can identify a physical address corresponding to a virtual address to be converted by the processor 110 using an entry stored in the TLB 130 (TLB hit), the MMU 120 may complete address conversion without accessing additional memory for identifying a page table including mapping information for the virtual address and the physical address.

Meanwhile, if the MMU 120 cannot identify a physical address corresponding to a virtual address to be converted by the processor 110 through the TLB 130 (TLB miss), the MMU 120 may access memory, such as DRAM 150, through an interconnector 140, and may perform address conversion.

Recently, frequency that the MMU 120 additionally accesses memory increases as the amount of data to be processed in the electronic device 100 increases. For example, if information about a virtual address to be converted into a physical address is not previously stored in the TLB 130, the MMU 120 has to access memory, such as the DRAM 150 including a page table, in order to obtain mapping information for the virtual address and the physical address.

Accordingly, due to an increase in the amount of data to be processed, frequency that a TLB miss occurs and frequency that the MMU 120 has to access the DRAM 150 may be increased. Accordingly, performance degradation of the electronic device 100 may be deepened.

A method of storing pieces of information in the TLB 130 as one entry by merging the pieces of information in which a virtual address and a physical address for a consecutive page have been mapped even without changing the size of a page and the size of the TLB 130 in order to prevent such performance degradation is described in detail below.

Figure 2:
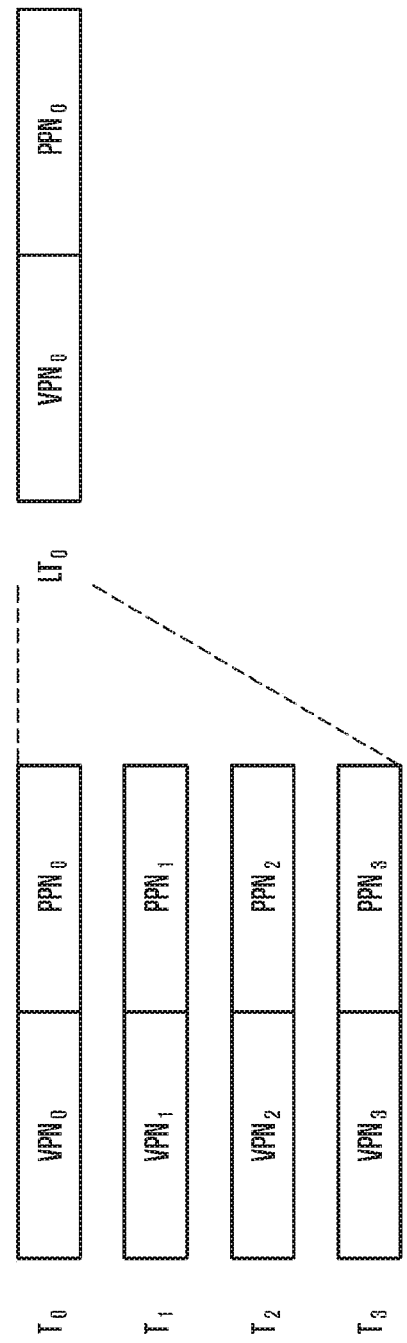
FIG. 2 is a diagram showing a method for an electronic device to manage memory according to an embodiment of the present disclosure.

FIG. 2 is a diagram showing a method for the electronic device 100 to manage memory according to an embodiment of the present disclosure.

Reference numerals 210 to 250 shown in FIG. 2 may mean entries in each of which a virtual page number (VPN) for a virtual address and a physical page number (PPM) for a physical address stored in the TLB 130 have been mapped.

The electronic device 100 or the MMU 120 of the electronic device 100 may determine whether physical addresses mapped to virtual addresses are consecutive with respect to at least two entries that belong to a plurality of entries in which virtual addresses and physical addresses are mapped and that have consecutive virtual addresses.

If, as a result of the determination, the physical addresses of the at least two entries are consecutive, the electronic device 100 or the MMU 120 of the electronic device 100 may merge the entries in which the virtual address and the physical address are consecutive into one entry.

Accordingly, pieces of information about the consecutive two pages may be merged into one entry.

Specifically, the MMU 120 may determine whether a VPN0 for the virtual address of the entry T0 210 and a VPN1 for the virtual address of the entry T1 220 are consecutive.

If, as a result of the determination, the VPN0 and the VPN1 are consecutive, the 120 may determine whether a PPN0 for the physical address of the entry T0 210 and a PPN1 for the physical address of the entry T1 220 are consecutive.

If, as a result of the determination, the PPN0 and the PPN1 are consecutive, the MMU 120 may determine whether the VPN1 and a VPN2 are consecutive.

If the VPN1 and the VPN2 are consecutive, the MMU 120 may determine whether the PPN1 and a PPN2 are consecutive. If as a result of the determination, the PPN1 and the PPN2 are consecutive, the MMU 120 may determine whether the VPN2 and a VPN3 are consecutive.

If, as a result of the determination, the VPN2 and the VPN3 are consecutive, the 120 may determine whether the PPN2 and a PPN3 are consecutive. If the PPN2 and the PPN3 are consecutive, the MMU 120 may determine whether the VPN3 and a VPN4 are consecutive.

If, as a result of the determination, the VPN3 and the VPN4 are not consecutive, the MMU 120 may generate one entry LT0 250 by merging the entries T0 210 to T3 240 determined to be consecutive.

The MMU 120 may indicate the VPN0 and the PPN0 of the first entry T0 210 in the merged entry LT0 250, may indicate information about the size of the LT0 250 or information indicating that the entries of the four pages have been merged, and may store them in the TLB 130.

Specifically, the MMU 120 may check specific bits of a virtual address included in the merged entry LT0 250. The specific bits are some bits of the VPN0 of the LT0 250, and may be 2 bits or 3 bits. For example, if the specific bits are determined to be 2 bits, the MMU 120 may check that bits at a specific location of the VPN0 of the LT0 250 correspond to which one of 00, 01, 10, and 11.

The MMU 120 may determine a storage location on the TLB 130 based on the checked specific bits and the size of a page for the merged why LT0 250. Furthermore, the MMU 120 may store the entry LT0 250 in the determined location. A detailed method for the MMU 120 to determine the location where the merged entry LT0 250 will be stored is described later.

Meanwhile, FIGS. 3A to 3D are diagrams showing methods of using memory according to various embodiments of the present disclosure. Specifically, FIGS. 3A to 3D are diagrams for illustrating various embodiments using the TLB 130.

In general, the TLB 130 may be implemented in the form of a set-associative TLB. For example, the TLB 130 may include sixteen ways of a way 0 to a way 15. Furthermore, a plurality of entries may be stored in each way.

The TLB 130 according to an embodiment of the present disclosure may be implemented so that all of ways store entries merged as described above.

Furthermore, in accordance with another embodiment of the present disclosure, some ways may store entries according to the aforementioned method, and the remaining ways may store entries according to the existing method.

Figure 3A:
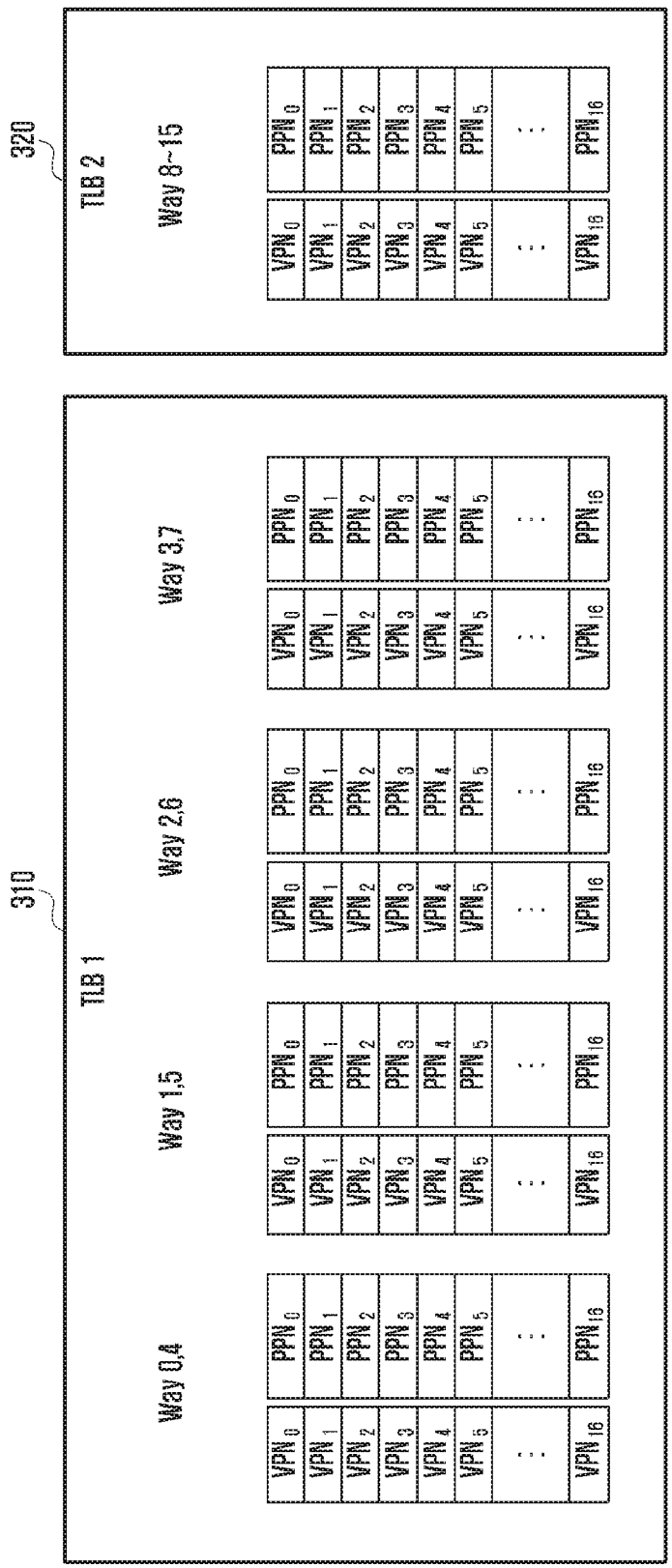
FIGS. 3A to 3D are diagrams showing methods of using memory according to various embodiments of the present disclosure.

Specifically, as shown in FIG. 3A, the TLB 130 may include a TLB 1 310 for storing entries merged according to the aforementioned method and a TLB 2 320 for storing entries according to the existing method.

The TLB 1 310 of FIG. 3A may store a merged entry for two pages (in general, the size of the two pages is 8 KB), a merged entry for four pages (in general, the size of the four pages is 16 KB), and a merged entry for sixteen pages (in general, the size of the sixteen pages is 64 KB) according to the aforementioned method.

Furthermore, the TLB 2 320 may store an entry for one page (in general, the size of the one page is 4 KB) according to the existing method.

Figure 3B:
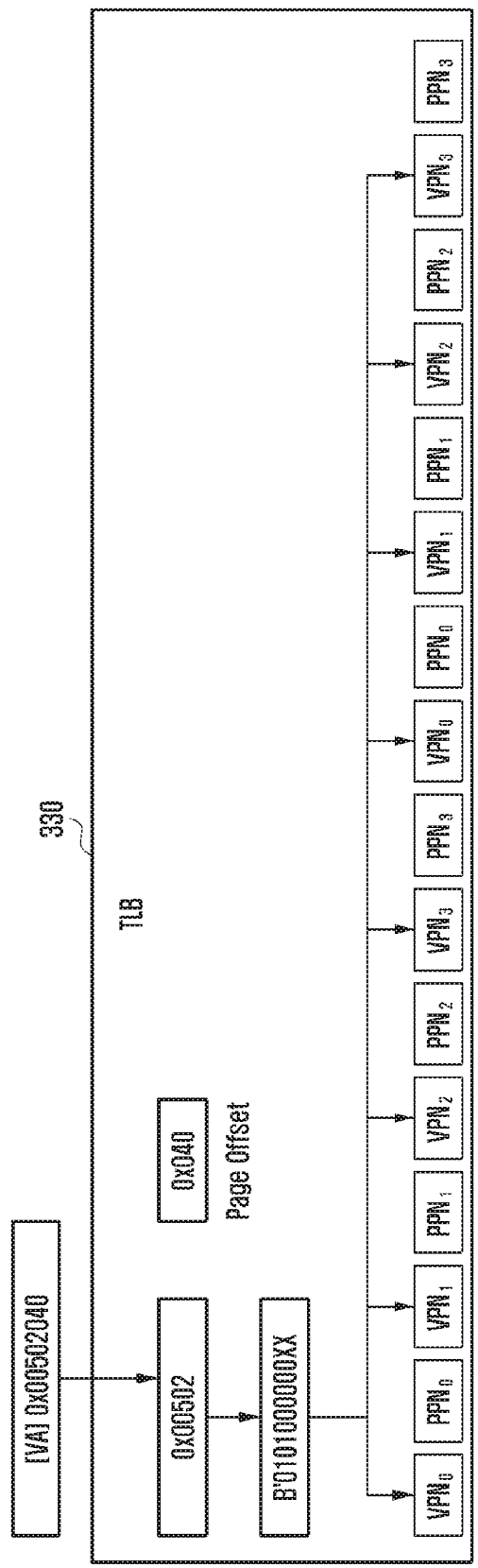

Meanwhile, FIG. 3B is a diagram shoeing the structure of a TLB 330 according to another embodiment of the present disclosure.

First, a method of implementing the TLB 330 according to a associative method may be taken into consideration. The TLB 330 shown in FIG. 3B is a structure used in a TLB that is used along with Level 1 cache, and may be used if a rapid response speed is important. In this case, hardware may be implemented in a content addressable memory (CAM) structure. For example, if the hardware is implemented as ternary CAM (TCAM), a merge method, such as that described above, may be used.

For example, if four pages having a size of 4 KB are merged, when four pages starting from 0x00500000, 0x00501000, 0x00502000, and 0x00503000 are merged, search in the TLB 300 may be attempted as B'01.01000000XX in the hardware implemented as the TCAM.

A TLB hit/miss may be determined by comparing the VPNs of entries according to a result of the search. As a result, if the number of pages to be merged is previously determined, the pages can be searched for as a Don't Care state by corresponding bits. Accordingly, address mapping information for pages can be easily merged.

Figure 3C:
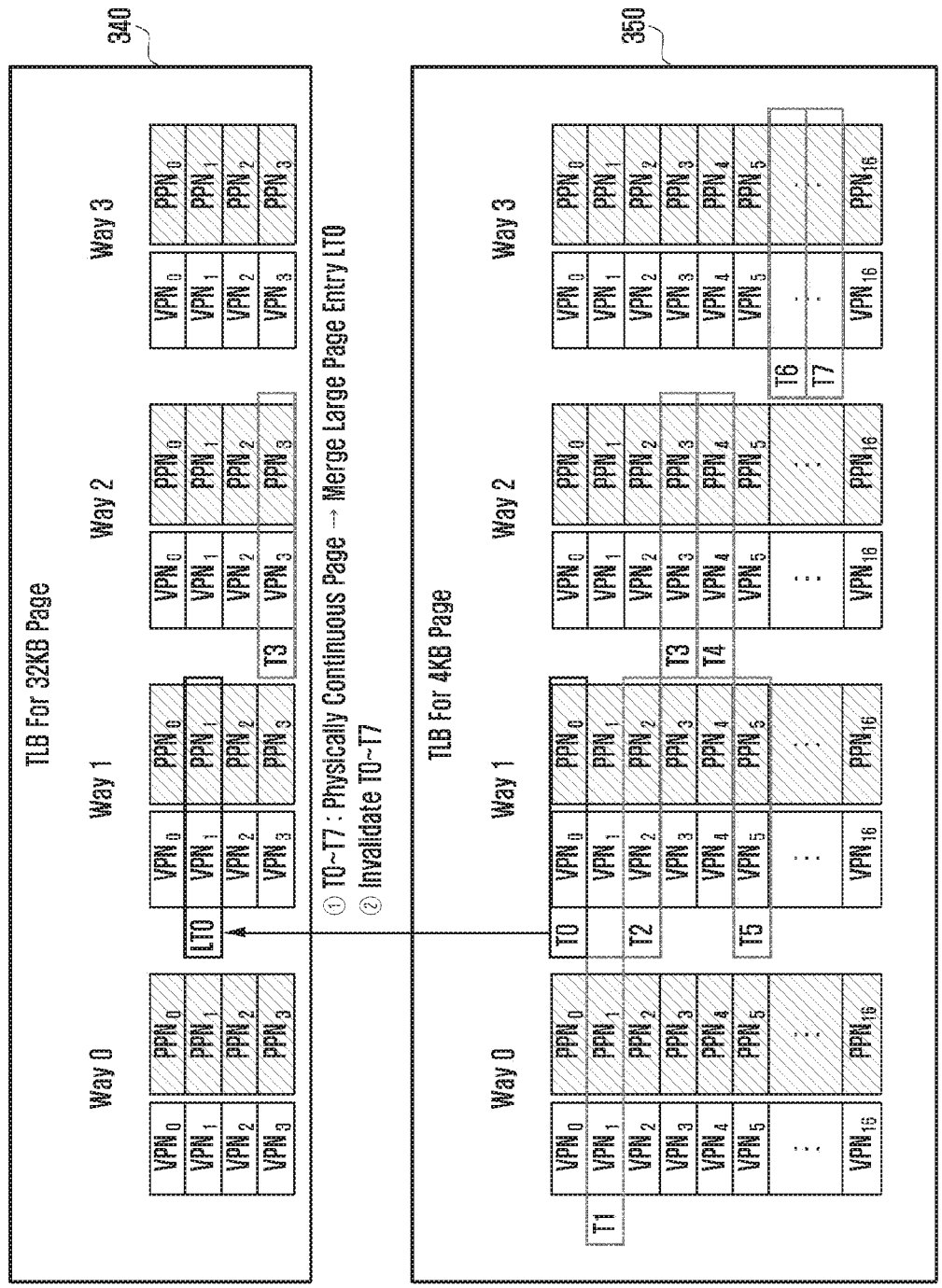

Meanwhile, as shown in FIG. 3C, an embodiment in which two or more TLBs are implemented is possible. Specifically, a TLB 340 for a large page and a TLB 350 for a small page may be separately implemented.

For example, the TLB 340 for a large page in FIG. 3C may be a region for storing the merge entry of address mapping information for eight pages, and the TLB 350 may be a region for storing an entry for one page.

Accordingly, if entries for eight pages included in the TLB 350 have been merged, the MMU 120 may move the merged entry to the TLB 340 and delete the entries for the eight pages included in the TLB 350.

Figure 3D:
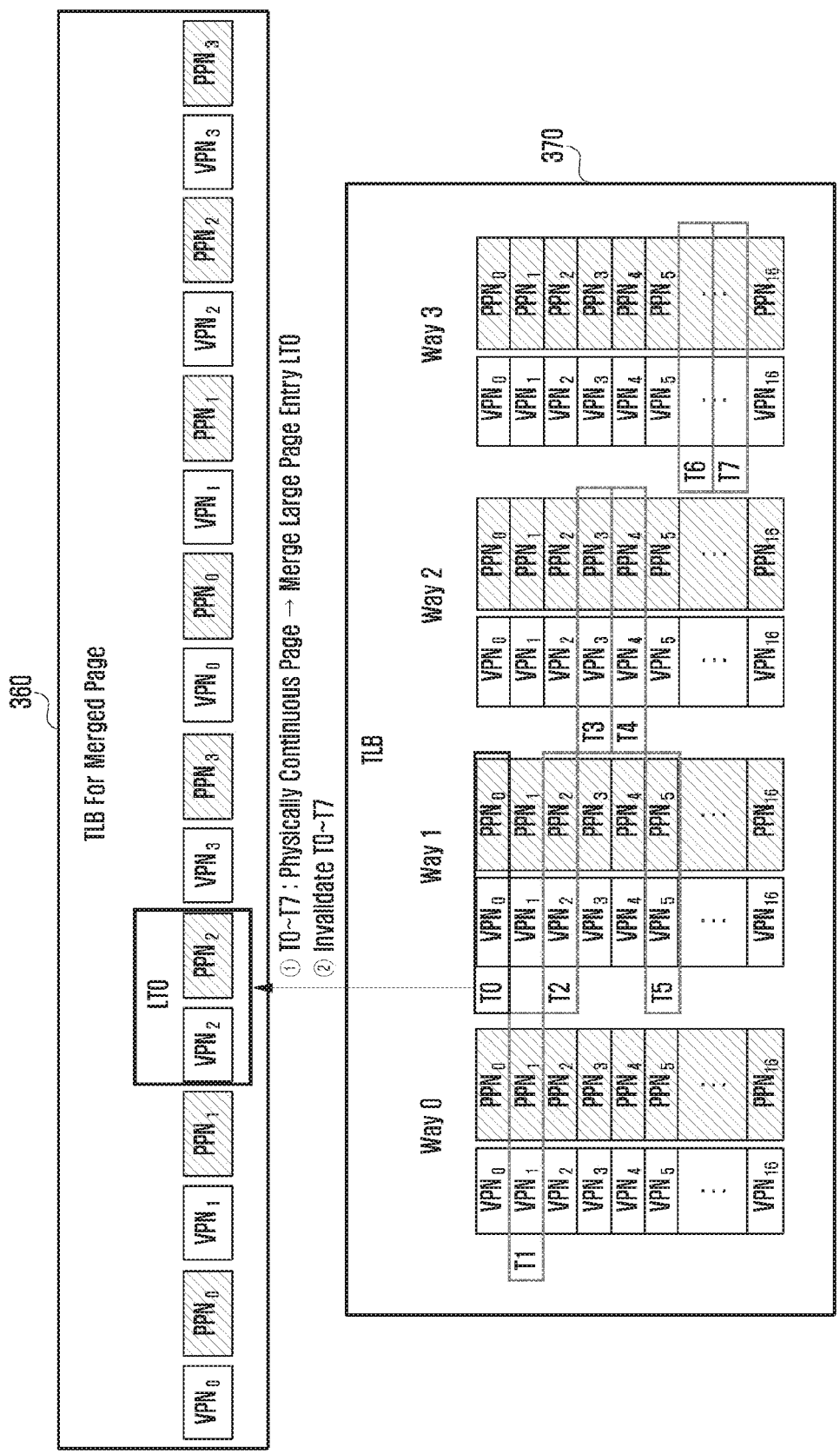

Meanwhile, FIG. 3D is a diagram showing an embodiment implemented by separating a TLB into a plurality of TLBs, specifically, by dividing the TLB into a TLB 360 for a merged entry and a TLB 370 for storing an entry according to the existing method.

For example, if entries for a plurality of pages included in the TLB 370 for storing entries according to the existing method are merged, the merged entry a be stored in the TLB 360 for a merged entry. Furthermore, the TLB 360 for a merged entry may be implemented as a frilly associative TLB as TCAM.

Meanwhile, if it is necessary to convert a virtual address into a physical address, the MMU 120 may find an entry corresponding to a TLB hit by searching the TLB 360 and the TLB 370 at the same time.

The electronic device or the MMU may merge entries of a TLB according to the two embodiments of the present disclosure. A method of merging entries of a TLB is described in detail below with reference to FIGS. 4 and 5.

Figure 4:
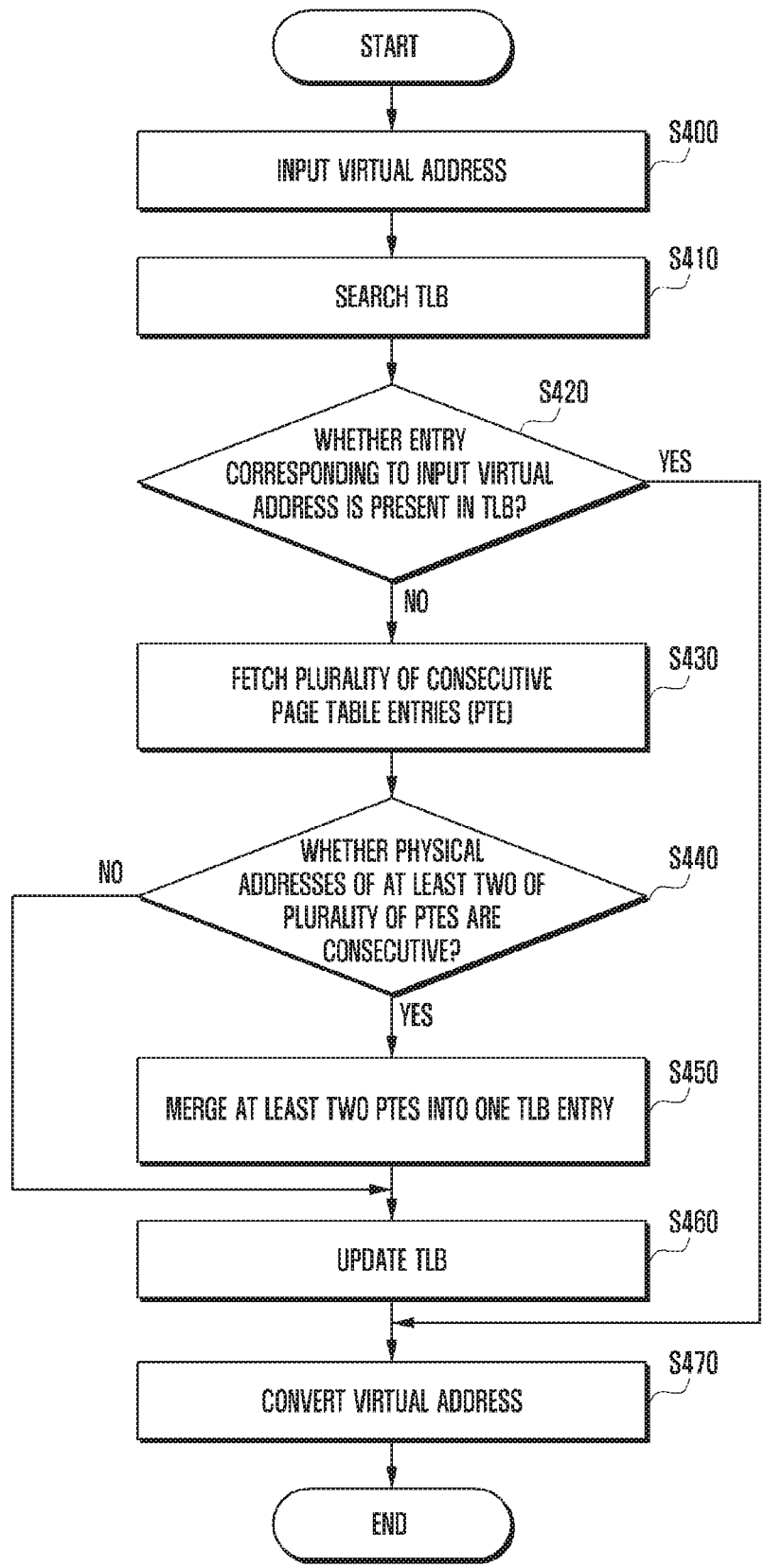
FIGS. 4 and 5 are flowcharts illustrating a method for an electronic device to merge entries according to various embodiments of the present disclosure.

In accordance with the method shown in FIG. 4, in order to convert a virtual address, an entry stored in a TLB is searched for. When a TLB miss is generated based on a result of the search, the MMU may read a plurality of page table entries (PTE) from second memory, such as DRAM. Furthermore, if physical addresses indicated by pieces of page information are consecutive according to the plurality of PTEs, the MMU may merge consecutive pages and assign a merged entry to a TLB.

The PTE may mean mapping information for a virtual address and a physical address stored in the second memory.

Specifically, when a virtual address is input at operation S400, the MMU may search a TLB at operation S410.

Furthermore, at operation S420, the MMU may determine whether an entry corresponding to the input virtual address is present in the TLB. For example, the TLB stores an entry in which a virtual address and a physical address for a page have been mapped. Accordingly, when the virtual address is input by the processor, the MMU may determine whether an entry corresponding to the virtual address is present or not by searching the TLB in order to perform address conversion.

If, as a result of the determination, an entry corresponding to the input virtual address is not present in the TLB (TLB miss), the MMU proceeds to operation S430 and may fetch a plurality of consecutive page table entries (PTE).

Specifically, when a TLB miss is generated, the MMU may perform search in a unit (e.g., an ARM CPU is 1 MB unit) predetermined in a system, and may generated the address of a page table on second memory, such as DRAM.

For example, it is assumed that a virtual address to be converted is 0x80000000 and the location of a PTE having information about a physical address mapped to the corresponding virtual address is 0x4000. A page table on the second memory may have been obtained by mapping the physical space of the page table to a consecutive virtual address space. Accordingly, in a consecutive PTE, virtual addresses mapped by the PTE may be consecutive.

Accordingly, at operation S440, the MMU may determine whether the physical addresses of at least two of the plurality of PTEs are consecutive.

For example, if the size of one PTE is 4 bytes, it may be seen that four pages, that is, a physical address indicated by the PTE of the physical address 0x4004 is 0x00115000, a physical address indicated by the PTE of a physical address 0x4008 is 0x00116000, and a physical address indicated by the PTE of a physical address 0x400C is 0x00117000 starting from a physical address 0x00114000 indicated by the PTE of a physical address 0x4000, are physically consecutive.

Accordingly, at operation S450, the MMU may merge at least two PTEs into one TLB entry. For example, the MMU may determine page mapping information of a 16 KB size based on mapping information of the virtual address and physical address of each page merged into a 16 KB page that starts from 0x00114000, and may merge at least two PTEs into one TLB entry. Furthermore, the MMU may indicate that a corresponding page is a merged page.

A bus of 128 bits may be used in the recent SoC. In this case, 16 bytes may be transferred through one transmission. In the 32 bits system, since one PTE is commonly 4 bytes, the MMU may fetch at least four pieces of page information to a TLB through one memory access. Accordingly, the TLB may be implemented to read and process several pieces of page information with respect to one TLB miss. In the present disclosure, several pieces of page information that have been read once may be merged and stored in a TLB.

At operation S460, the MMU updates the TLB. At operation S470, the MMU may convert the virtual address into a physical address.

Figure 5:
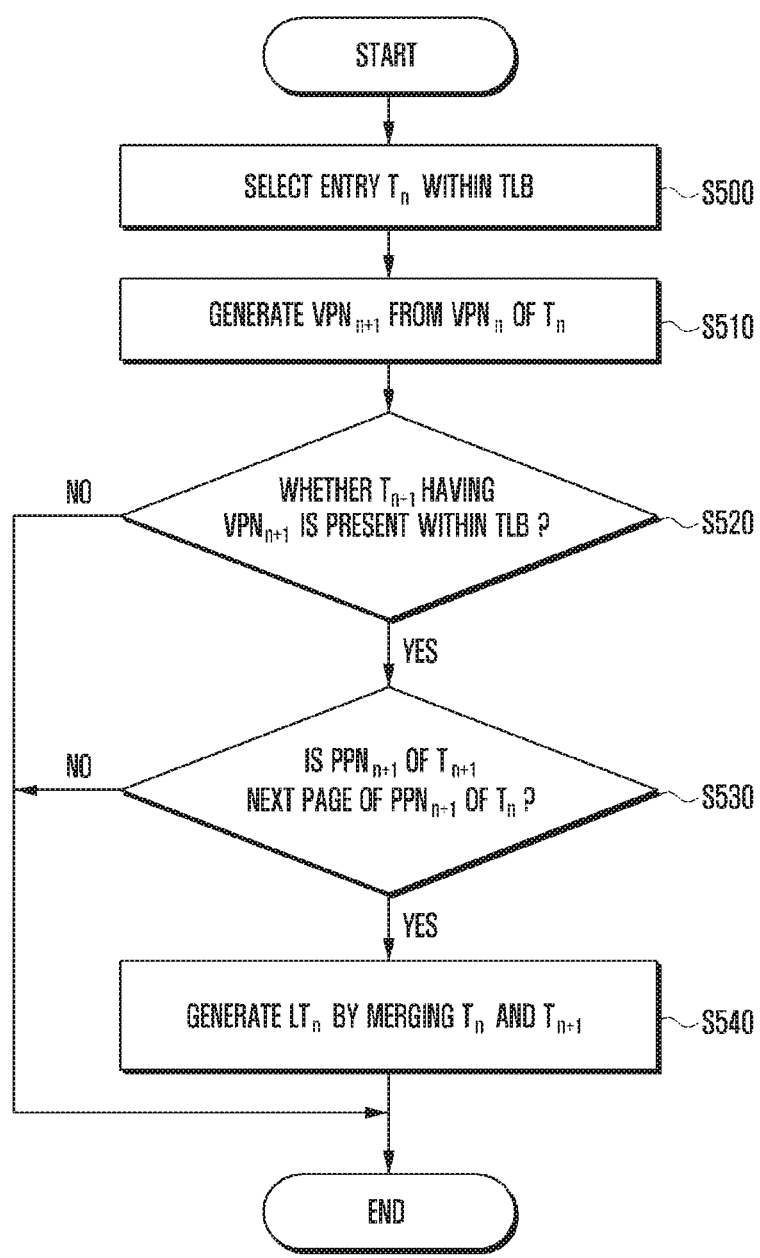

Meanwhile, the method shown in FIG. 5 is a method for the MMU to search for entries that may be merged within a TLB by repeatedly checking the TLB when a point of time at which there is no memory access by the processor or a master IP is reached and to merge the retrieved entries.

The MMU may search for the entries that may be merged within the TLB in response to a command from the processor or the master IP. Alternatively, when the processor or the master enters a sleep state, the MMU may search for the entries that may be merged within the TLB.

Furthermore, the MMU may search for the entries that may be merged within the TLB according to a preset time.

First, at operation S500, the MMU may select an entry Tn within a TLB. For example, the MMU may select the entry T0 of the most recently used TLB in a set 0.

The set may mean a set of entries stored in the TLB in a row direction. For example, first entries respectively stored in the way 0 to the way 15 may be entries included in the set 0, and second entries respectively stored in the way 0 to the way 15 may be entries included in a set 1.

At operation S510, the MMU may generate the VPNn to VPNn+1 of the Tn. Furthermore, at operation S520, the MMU may determine whether a Tn+1 having a VPNn+1 is present in the TLB.

For example, the MMU may select the most recently used TLB Entry T0 in the set 0. Furthermore, the MMU may search the TLB for a VPN1 that has been subjected to the VPN0+1 from the T0.

At operation S530, the MMU may determine whether the PPNn+1 of the Tn+1 is a next page of the PPNn of the Tn. For example, if the VPN1 is present in the TLB, the MMU may determine whether a PPN1 mapped to the VPN1 is a PPN0+1.

If, as a result of the determination, the PPNn+1 of the Tn+1 is a next page of the PPNn of the Tn, at operation S540, the MMU may generate an LTn by merging the Tn and the Tn+1.

Furthermore, the MMU may check a plurality of consecutive physical pages by performing the aforementioned method on a VPN2 and a VPN3 in the same manner before it generates the LTn.

For example, if the MMU has checked four consecutive physical pages, it may generate mapping information of a virtual address and a physical address, corresponding to the size of the four consecutive pages, as the four consecutive physical pages.

Furthermore, the MMU may invalidate a T0 to a T3 within the TLB. Furthermore, the MMU may allocate merged page information to the TLB. For example, the MMU may store the merged page information, corresponding to the four pages, in the TLB.

In accordance with the aforementioned method, the electronic device can obtain mapping information for a plurality of pages even in one entry stored in a TLB.

Meanwhile, FIGS. 6A to 6D are diagrams showing a characteristic that divides the location where a merged entry will be stored within a TLB if specific bits are 2 bits according to an embodiment of the present disclosure.

Figure 6A:
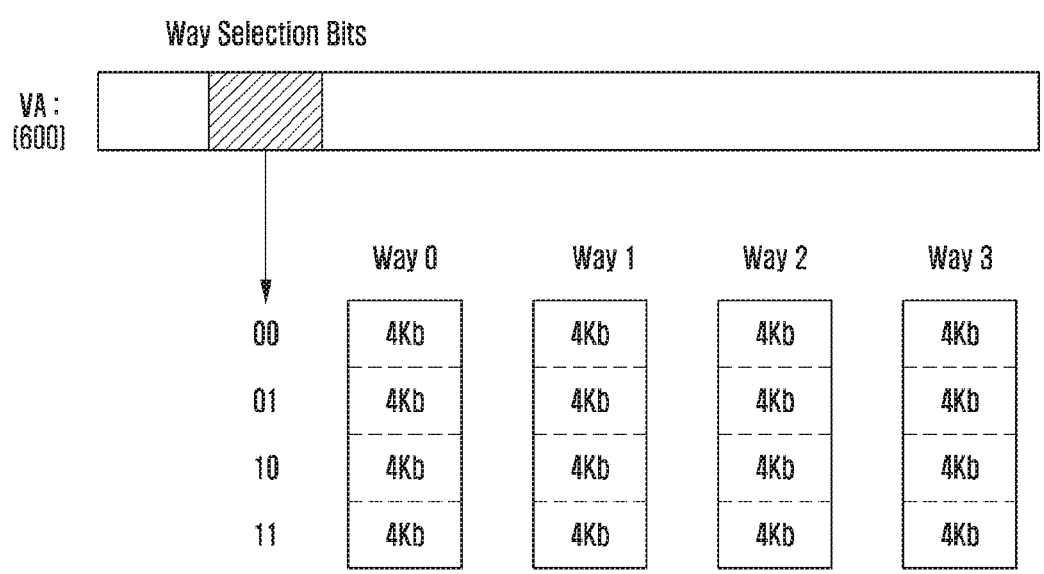
FIGS. 6A to 6D are diagrams showing a characteristic that divides the storage location of a merged entry within a TLB if specific bits are 2 bits according to an embodiment of the present disclosure.

As shown in FIG. 6A, the preset number of bits at a specific location of a virtual address 600 may be used as specific bits. Hereinafter, such specific bits are called way selection bits.

Furthermore, the MMU 120 may include hardware that determines the location where a merged entry will be stored for each way selection bit. For example, the hardware may be called a way selector.

FIGS. 6A to 6D are diagrams showing embodiments if the way selection bits are 2 bits. In this case, values of the way selection bits may be "00", "01", "10" and "11."

FIGS. 6A to 6D have been illustrated as including four ways in a TLB, but they are only embodiments. The present disclosure is not limited to the number of ways included in a TLB.

Furthermore, FIG. 6A is a diagram showing an embodiment if there is no merged entry or if there is no page to be merged by the aforementioned method. In general, a page may be implemented in a size of 4 KB. Accordingly, each way of a TLB may store mapping information of the virtual address and physical address of a page for the size of 4 KB.

If the MMU has generated a merged entry by merging mapping information for two pages according to the aforementioned method, the MMU may generate the merged entry including mapping information of the virtual address and physical address of a page for a size of 8 KB.

Figure 6B:
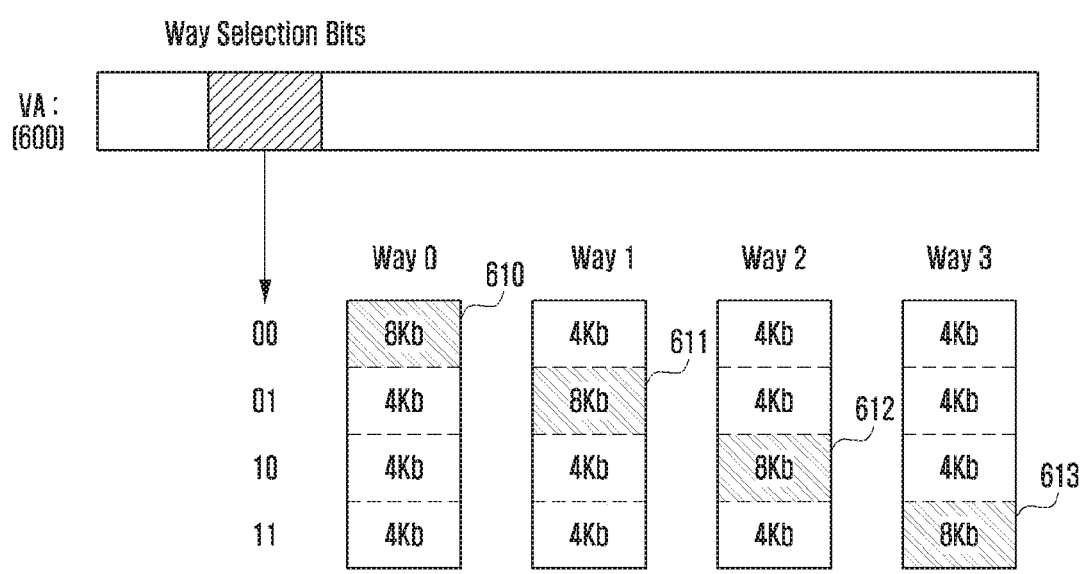

In this case, as shown in FIG. 6B, the MMU may configure a way selector with respect to a virtual address whose way selection bits are "00" so that an 8 KB page entry in which two pages have been merged is stored in a way 0.

Furthermore, the MMU may configure a way selector with respect to a virtual address whose way selection bits are "01" so that an 8 KB page entry in which two pages have been merged is stored in a way 1 (611).

Likewise, the MMU may configure a way selector with respect to a virtual address whose way selection bits are "10" so that an 8 KB page entry in which two pages have been merged is stored in a way 2 (612), and may configure a way selector with respect o a virtual address whose way selection bits are "11" so that an 8 KB page entry in which two pages have been merged is stored in a way 3 (613).

Although not shown in FIG. 6B, the MMU may configure a way selector with respect to a virtual address whose way selection bits are "00" so that an 8 KB page entry in which two pages have been merged is stored in a way 4.

If the way selector is configured according to the aforementioned method, the way 0 may store the entry in which the two pages have been merged in the virtual address whose way selection bits are "00", the way 1 may store the entry in which the two pages have been merged in the virtual address whose way selection bits are "01", the way 2 may store the entry in which the two pages have been merged in the virtual address whose way selection bits are "10", and the way 3 may store the entry in which the two pages have been merged in the virtual address whose way selection bits are "11." Such a configuration has only to be performed once when the two pages are first merged. Only a process of storing a subsequently merged page in a way selector-configured way is performed on the merge page based on the way selection bits of a virtual address.

Meanwhile, if the MMU has generated a merged entry by merging mapping information for four pages according to the aforementioned method, the MMU may generate the merged entry including the mapping information for the virtual address and physical address of a page having a size of 16 KB.

Figure 6C:
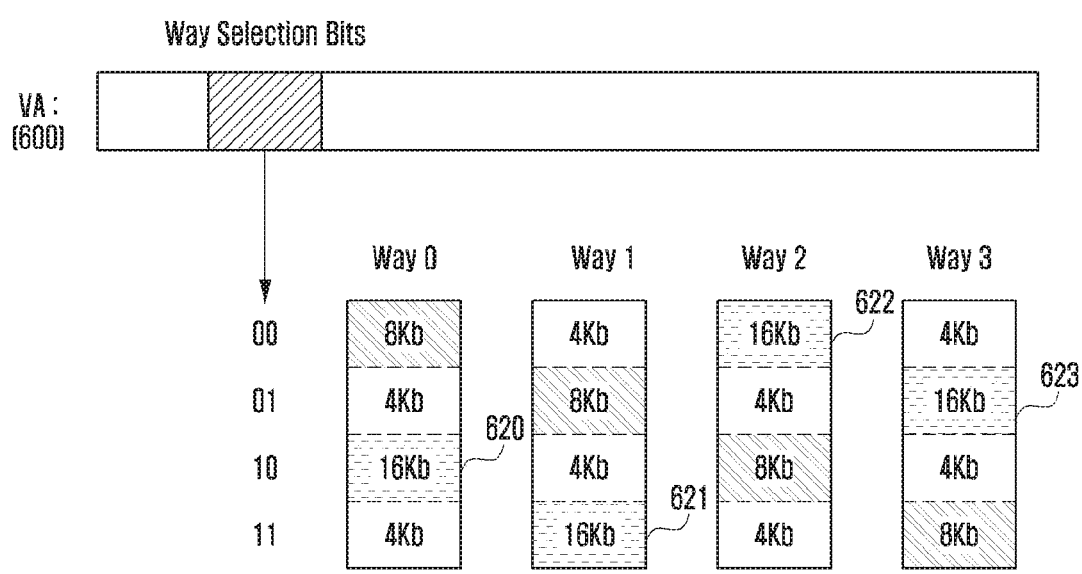

In this case, as shown in FIG. 6C, the MMU may perform a configuration on a virtual address whose way selection bits are "10" so that an entry in which four pages have been merged is stored in a way 0 (620).

Furthermore, the MMU may perform a configuration on a virtual address whose way selection bits are "11" so that an entry in which four pages have been merged is stored in the way 1 (621). Likewise, the MMU may perform a configuration on a virtual address whose way selection bits are "00" so that an entry in which four pages have been merged is stored in the way 2 (622), and may perform a configuration on a virtual address whose way selection bits are "01" so that an entry in which four pages have been merged is stored in the way 3 (623). Although not shown in FIG. 6C, the MMU may perform a configuration on a virtual address whose way selection bits are "00" so that an entry in which two pages have been merged is stored in the way 4.

If the way selector is configured according to the aforementioned method, the way 0 may store the entry in which the four pages have been merged with respect to the virtual address having the way selection bits of "10", the way 1 may store the entry in which the four pages have been merged with respect to the virtual address having the way selection bits of "11", the way 2 may store the entry in which the four pages have been merged with respect to the virtual address having the way selection bits of "00", and the way 3 may store the entry in which the four pages have been merged with respect to the virtual address having the way selection bits of "01." Such a configuration has only to be performed once when the four pages are first merged. Only a process of storing a subsequently merged page in a way selector-configured way is performed on the merge page based on the way selection bits of a virtual address.

Furthermore, if the MMU has generated a merged entry by merging mapping information for sixteen pages according to the aforementioned method, the MMU may generate the merged entry including the mapping information of the virtual address and physical address of a page having a size of 64 KB.

Figure 6D:
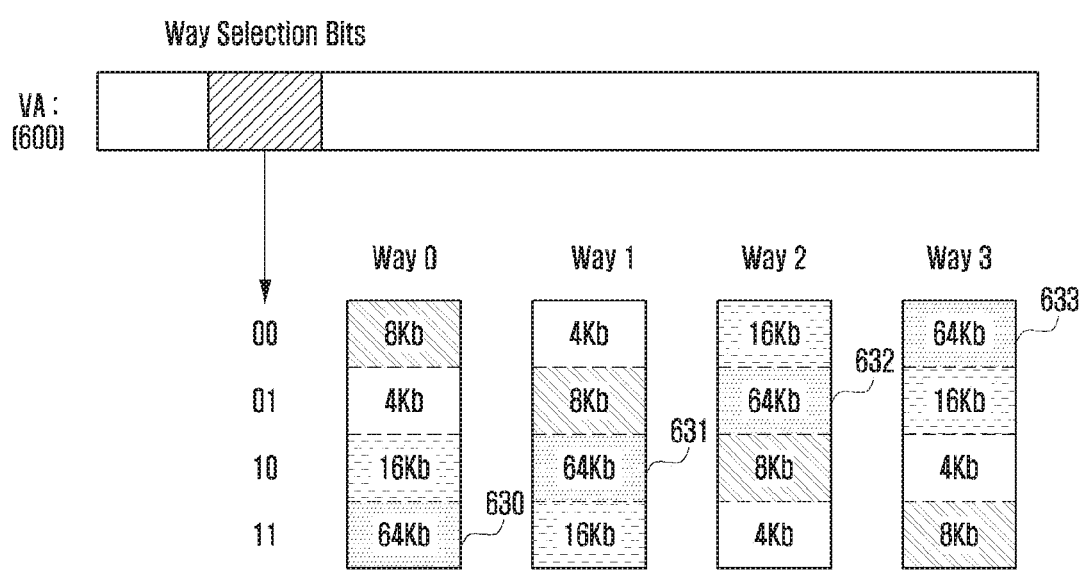

In this case, as shown in FIG. 6D, the MMU may perform a configuration on a virtual address whose way selection bits are "11" so that an entry in which sixteen pages have been merged is stored in a way 0 (630).

Furthermore, the MMU may perform a configuration on a virtual address whose way selection bits are "10" so that an entry in which sixteen pages have been merged is stored in a way 1 (631). Likewise, the MMU may perform a configuration on a virtual address whose way selection bits are "01" so that an entry in which sixteen pages have been merged is stored in a way 2 (632). The MMU may perform a configuration on a virtual address whose way selection bits are "00" so that an entry in which sixteen pages have been merged is stored in a way 3 (633). Although not shown in FIG. 6D, the MMU may perform a configuration on a virtual address whose way selection bits are "00" so that an entry in which sixteen pages have been merged is stored in a way 4.

If the way selector is configured according to the aforementioned method, the way 0 may store the entry in which the sixteen pages have been merged with respect to the virtual address having the way selection bits of "11", the way 1 may store the entry in which the sixteen pages have been merged with respect to the virtual address having the way selection bits of "10", the way 2 may store the entry in which the sixteen pages have been merged with respect to the virtual address having the way selection bits of "01", and the way 3 may store the entry in which the sixteen pages have been merged with respect to the virtual address having the way selection bits of "00." Such a configuration has only to be performed once when the sixteen pages are first merged. Only a process of storing a subsequently merged page in a way selector-configured way is performed on the merge page based on the way selection bits of a virtual address.

A storage location in each of the ways is only an embodiment, and the location where each merged entry is stored is not limited thereto. Furthermore, the merge of entries for two pages, four pages and sixteen pages is only an embodiment, and the number of pages, that is, the subject of entry merge, is not limited.

The MMU can dynamically configure the storage region of a TLB based on the size of a page for a merged entry according to the aforementioned method.

Meanwhile, the number of way selection bits may exceed 2. In accordance with an embodiment of the present disclosure, as shown in FIGS. 7A to 7C, way selection bits may be implemented as three bits.

Figure 7A:
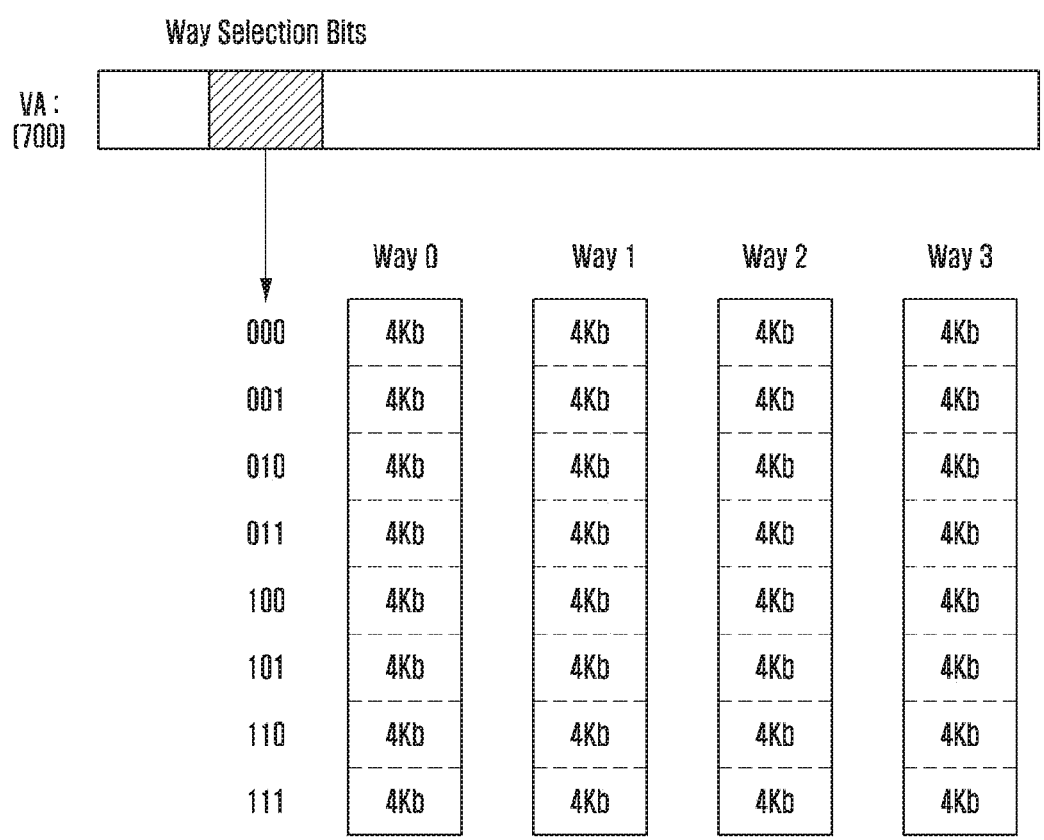
FIGS. 7A to 7C are diagrams showing a characteristic that divides the storage location of a merged entry within a TLB if specific bits are 3 bits according to another embodiment of the present disclosure.
Figure 7B:
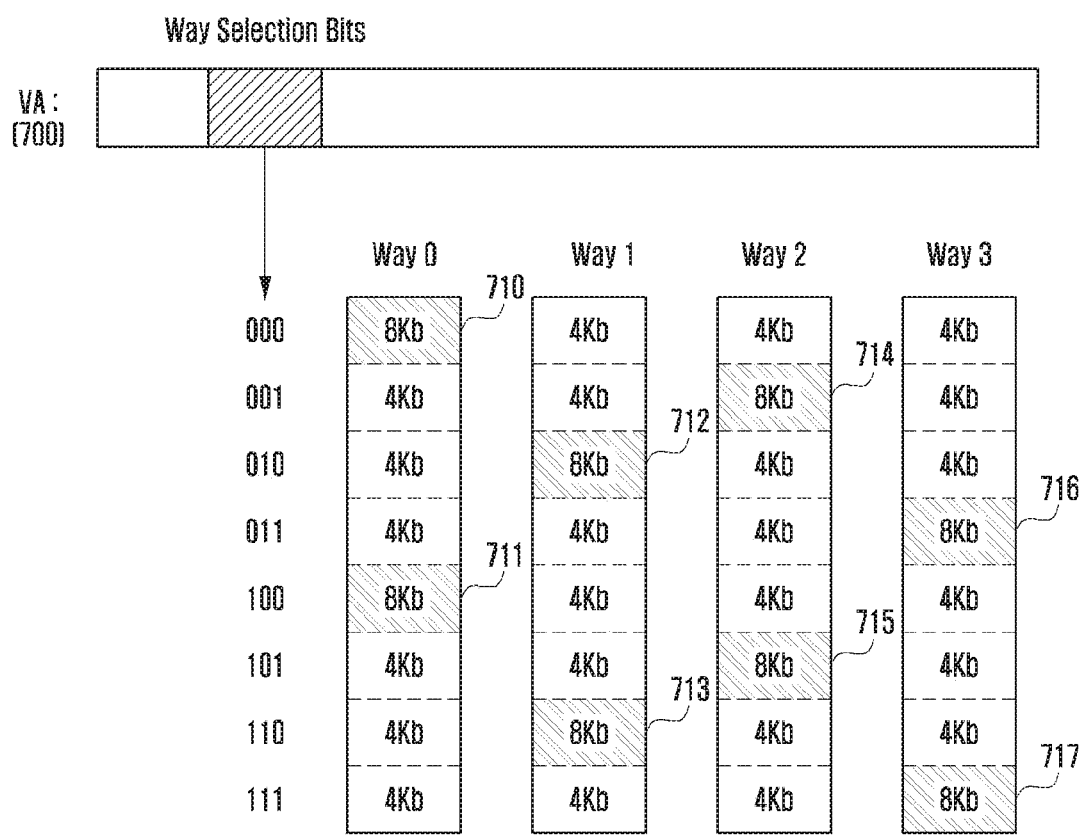
Figure 7C:
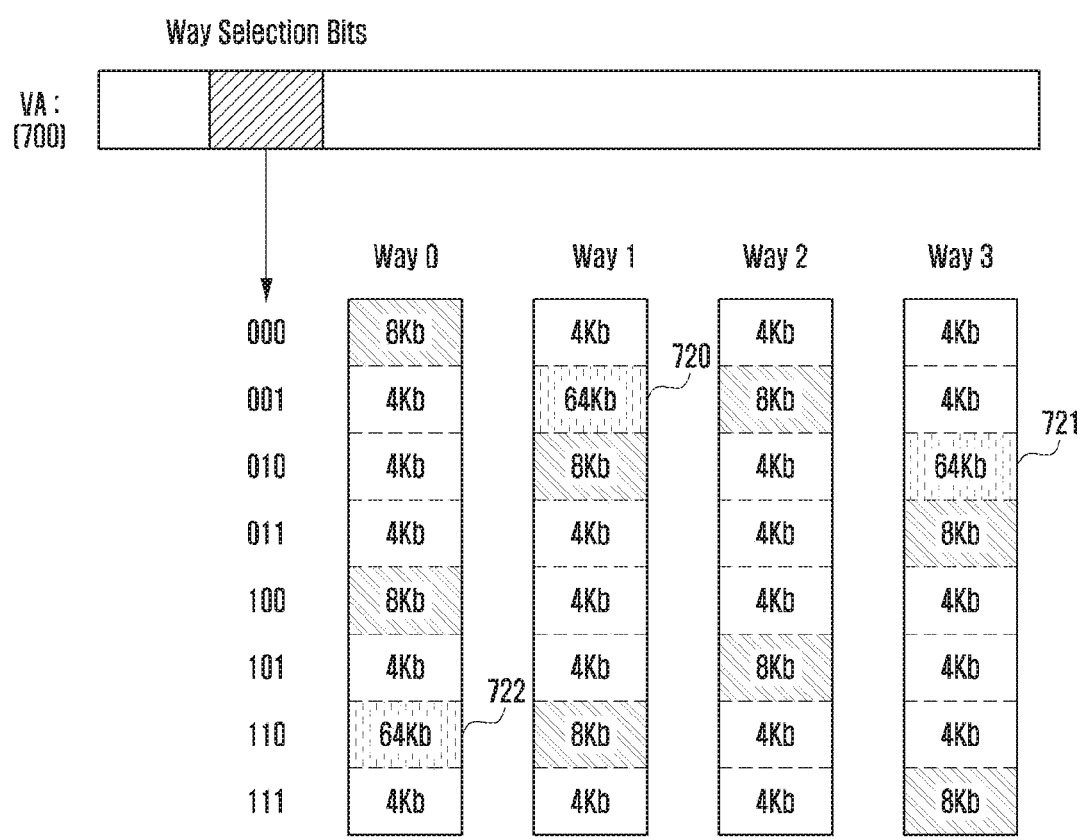

In FIGS. 7A to 7C, a TLB has been illustrated as including four ways, but this is only an embodiment and the number of ways within a TLB in the present disclosure is not limited thereto.

FIG. 7A is a diagram showing an embodiment if there is no merged entry or if there is no page to be merged according to the aforementioned method as in FIG. 6A. In general, a page may be implemented to have a size of 4 KB. Accordingly, each way of a TLB may store mapping information for the virtual address and physical address of a page having a size of 4 KB.

If the MMU has generated a merged entry by merging mapping information for two pages according to the aforementioned method, the MMU may generate the merged entry including the mapping information of the virtual address and physical address of a page having a size of 8 KB.

For example, as shown in FIG. 7B, the MMU may perform a configuration on a virtual address whose way selection bits are "000" so that an entry in which two pages have been merged is stored in a way 0 (710). Furthermore, the MMU may perform a configuration on a virtual address whose way selection bits are "001" so that an entry in which two pages have been merged is stored in a way 2 (714). If the way selection bits are implemented as three bits, as described in FIGS. 6A to 6D, the storage region of a TLB can be dynamically operated compared to a case where the way selection bits are implemented as two bits.

Furthermore, a merged entry for pages having the same size may also be stored at a location within the same way. For example, a configuration may be performed on a virtual address whose way selection bits are "100" so that an entry in which two pages have been merged is stored in the way 0 (711).

Furthermore, after a specific location has been configured to store a merged entry for two pages, if any one merged entry for the two pages is not stored at the specific location or a threshold or more is not stored at the specific location, the MMU may change the specific location into a region for storing an entry for a different number of pages.

For example, if way selection bits are "100" and only one merged entry for two pages has been configured in reference numeral 711, stored in a way 7 and never used for a threshold time, the MMU may remove a merged entry having way selection bits of "100" for two pages from the way 0. In this case, the MMU may change a configuration corresponding to reference numeral 711 of a way selector into a configuration for the storage space of a 4 KB page entry, and may use the way 0 as an 8 KB page region only when the way selection bits are "000."

Furthermore, if the MMU has generated a merged entry by newly merging mapping information for sixteen pages, the MMU may generate the merged entry including the mapping information of the virtual address and physical address of a page having a size of 64 KB, and may configure a storage location. FIG. 7C shows the above contents.

For example, the MMU may perform a configuration on a virtual address whose way selection bits are "001" so that an entry in which sixteen pages have been merged is stored in a way 1 (720).

Furthermore, the MMU may perform a configuration on a virtual address whose way selection bits are "010" so that an entry in which sixteen pages have been merged is stored in a way 3 (721).

Meanwhile, although not shown in FIG. 7C, eight ways are used, and a configuration may be performed so that a merged page entry is stored with respect to virtual addresses having different way selection bits, respectively. In this case, the number of entries according to a page size can be adjusted more finely compared to a case where two bits are used as way selection bits.

The MMU can easily perform address conversion according to the storage location of a merged entry when it converts a virtual address into a physical address because the storage location is different according to the size of each a merged page according to the aforementioned method.

An element of the electronic device which merges entries according to the aforementioned method, an element monitoring merge, and an element performing address conversion in a TLB in which a merged entry has been stored are described in detail below with reference to FIG. 8.

Figure 8:
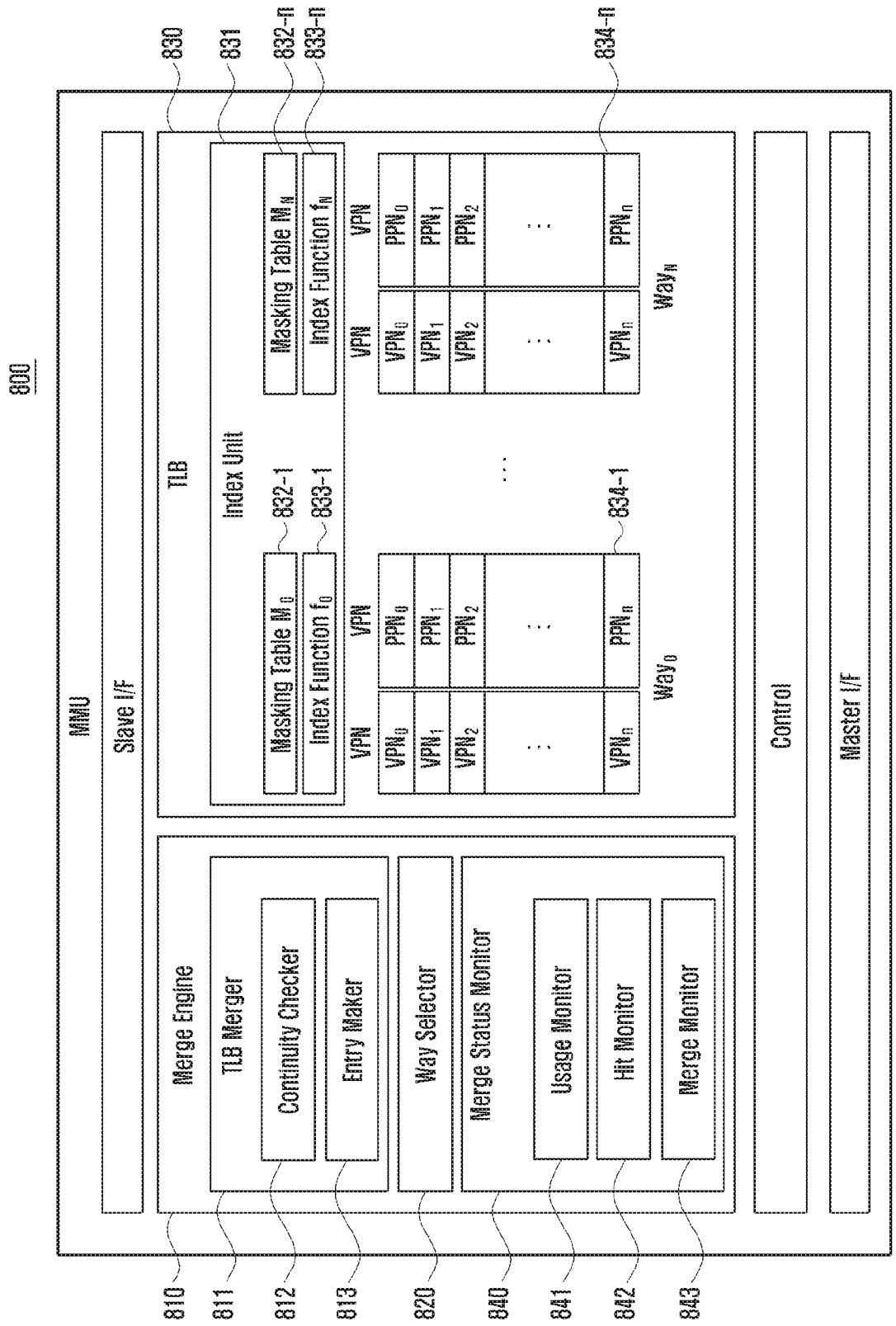
FIG. 8 is a diagram showing the elements of an MMU according to an embodiment of the present disclosure.

FIG. 8 is a diagram specifically showing the elements of an MMU 800 according to an embodiment of the present disclosure. The MMU 800 may include a merge engine 810, a way selector 820, a TLB 830 and a merge status monitor 840.

The merge engine 810 may include a TLB merger 811. Furthermore, the TLB merger 811 may include a continuity checker 812 and an entry maker 813.

The TLB merger 811 is an element for merging entries according to the aforementioned method and storing the merged entry in a determined location of a TLB.

Specifically, the continuity checker 812 may determine whether virtual addresses included in an entry are consecutive according to the aforementioned method. Furthermore, the continuity checker may determine whether physical addresses are consecutive with respect to an entry in which virtual addresses are consecutive. Accordingly, the continuity checker 812 may check a plurality of entries in which a mapped virtual address and physical address are consecutive, respectively.

The entry maker 813 may generate one TLB entry with respect to a TLB entry whose continuity has been checked. Specifically, the entry maker 813 may generate one merge entry including mapping information for a virtual address and physical address for a plurality of pages that are consecutive.

Meanwhile, the way selector 820 may determine the location where a merged entry is stored. For example, the way selector 820 may determine a detailed location within a TLB including a plurality of ways according to the size of a page corresponding to a merged entry.

Specifically, the way selector 820 may set specific bits of a virtual address included in a merged entry as way selection bits. For example, the way selector 820 may set two bits at a specific location of a virtual address as way selection bits.

Specifically, if way selection bits are 2 bits, the selection bits may be "00", "01", "10" and "11."

If the entry maker 813 has generated a merged entry by merging mapping information for two pages, the way selector 820 may determine the location where the merged entry including the mapping information for the virtual address and physical address of a page having a size of 8 KB is to be stored.

For example, the way selector 820 may perform allocation so that an 8 KB page entry in which two pages have been merged is stored in the way 0 with respect to a virtual address whose merged way selection bits are "00."

Furthermore, the way selector 820 may perform allocation so that an 8 KB page entry in which two pages have been merged is stored in the way 0 with respect to a virtual address whose way selection bits are "10."

Meanwhile, if the entry maker 813 has generated a merged entry by merging mapping information for four pages, the way selector 820 may determine the location where a merged entry including the mapping information of the virtual address and physical address of a page having a size of 16 KB will be stored.

For example, the way selector 820 may perform allocation so that a 16 KB page entry in which four pages have been merged is stored in the way 0 with respect to a virtual address whose way selection bits are "11."

As a result, the way selector 820 may flexibly allocate a location for storing a merged entry depending on the amount of merged entry used.

For example, if an 8 KB page entry in which two pages have been merged has been stored in an allocation region of an 8 KB size, the way selector 820 may additionally allocate a region for storing the 8 KB page entry.

Alternatively, if the hit rate of the 8 KB page entry is high, the way selector 820 may increase the proportion of the allocation region for the 8 KB page entry.

In contrast, if one region of the way 0 has been allocated for an 8 KB page entry as described above, but the hit rate of a page entry in the one region is not high, the way selector 820 may decrease the proportion of an allocation region for an 8 KB size.

For example, the way selector 820 may allocate half the one region in order to store an entry corresponding to a page of a common 4 KB size.

The way selector 820 may transfer information about the page size of a merged entry to the index unit 831 of the TLB 830 to be described later. For example, in order to perform address conversion from a virtual address to a physical address, the way selector 820 may transmit information about locations where merged entries corresponding to various sizes of pages have been stored according to specific bits to the index unit 831.

The TLB 830 may store an entry in which a virtual page number (VPN) for a virtual address and a physical page number (PPN) for a physical address have been mapped as described above.

Specifically, as shown in FIG. 8, the TLB 830 may include a plurality of ways 834-1 to 834-n. Furthermore, the TLB 830 may store the entry in each way.

Furthermore the TLB 830 may include the index unit 831. The index unit 831 may receive information about a page size corresponding to a merged entry that needs to be applied for search of each way from the way selector 820. Furthermore, the index unit 831 may generate an index for searching for a TLB entry for each way.

Specifically, the index unit 831 may include masking tables 832-1 to 832-n and index functions 833-1 to 833-n for each way.

The index functions 833-1 to 833-n may be present in respective ways, but this is only an embodiment and an index function may be present in a plurality of ways.

Meanwhile, the number of index functions 833-1 to 833-n may correspond to the number of page sizes supported by the MMU 800. For example, if the MMU 800 supports a merged entry for two pages, a merged entry for four pages, a merged entry for eight pages, and a merged entry for sixteen pages, every four index functions 833-1 to 833-n may be present in each way.

The masking tables 832-1 to 832-n may provide the respective index functions 833-1 to 833-n with index masks and offset masks used according to page sizes.

Specifically, each way of the TLB 830 may include a merged entry corresponding to a page of a different size. An index mask may be different depending on the number of merged entries allocated to each way by the way selector 820.

Furthermore, each way may be divided into offsets according to the amount of a merged entry allocated so that a contention for performing address conversion is generated only in a merged entry of pages having the same size. The mask of the offset may be different depending on the size of a page of the merged entry.

Figure 9:
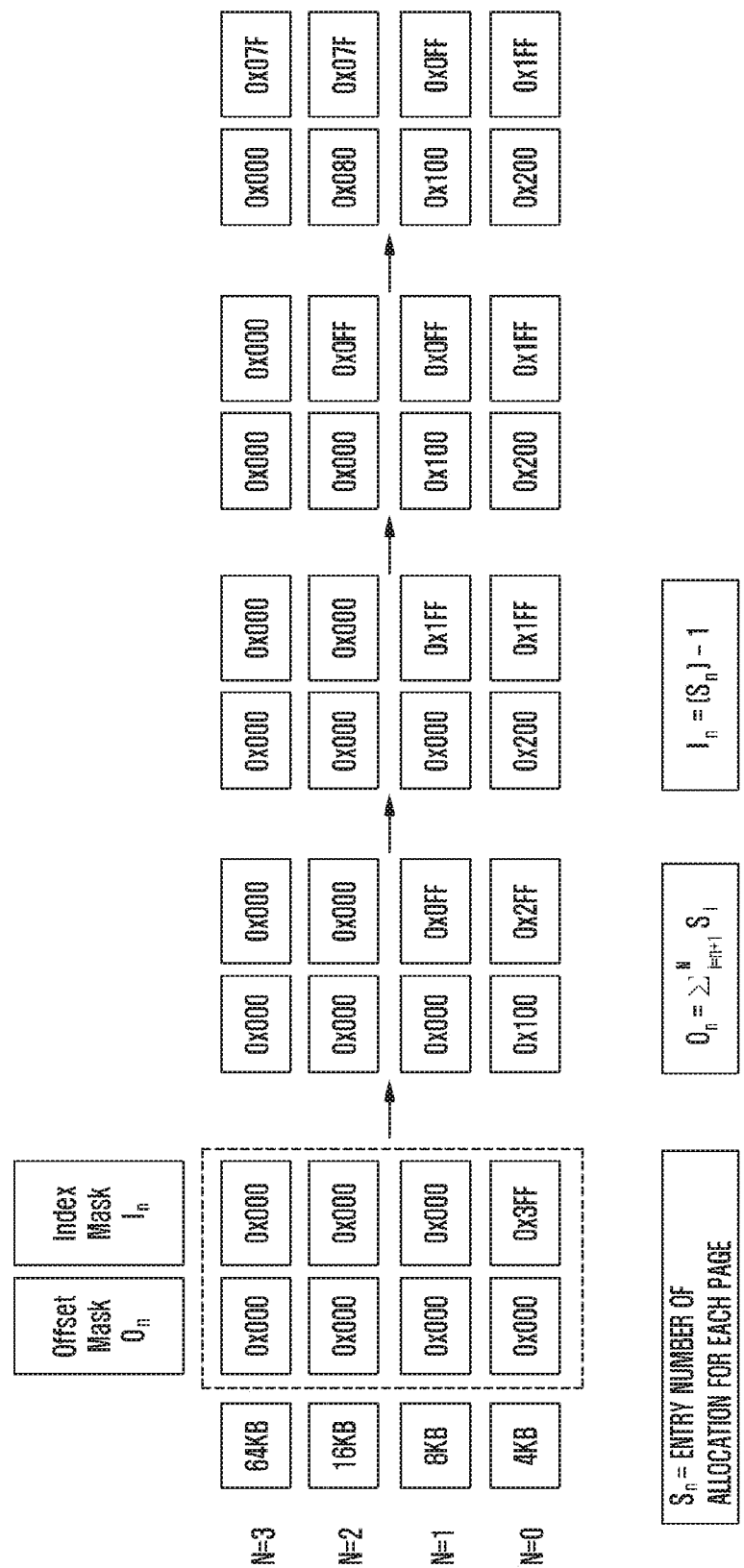
FIG. 9 is a diagram showing a masking table according to an embodiment of the present disclosure.

Meanwhile, FIG. 9 is a diagram showing the masking tables 832-1 to 832-n according to an embodiment of the present disclosure. Specifically, FIG. 9 is a diagram showing a case where 1024 entries are divided and used by pages of four sizes. FIG. 9 shows an embodiment in which an offset mask On and an index mask In are changed by the way selector 820 of FIG. 8.

Referring back to FIG. 8, the merge status monitor 840 may monitor a merged entry stored in the TLB 830. Information obtained through the monitoring is transmitted to the way selector 820, and the way selector 820 may use the information to allocate the region of each way.

The merge status monitor 840 may include a usage monitor 841, a hit monitor 842 and a merge monitor 843.

The usage monitor 841 may monitor the usage of a TLB for each page size corresponding to a merged entry. For example, if a merged page uses the entire region (way) allocated thereto, the usage monitor 841 may transmit information indicating that storage is no longer possible in the region (way) to the way selector 820.

Figure 10:
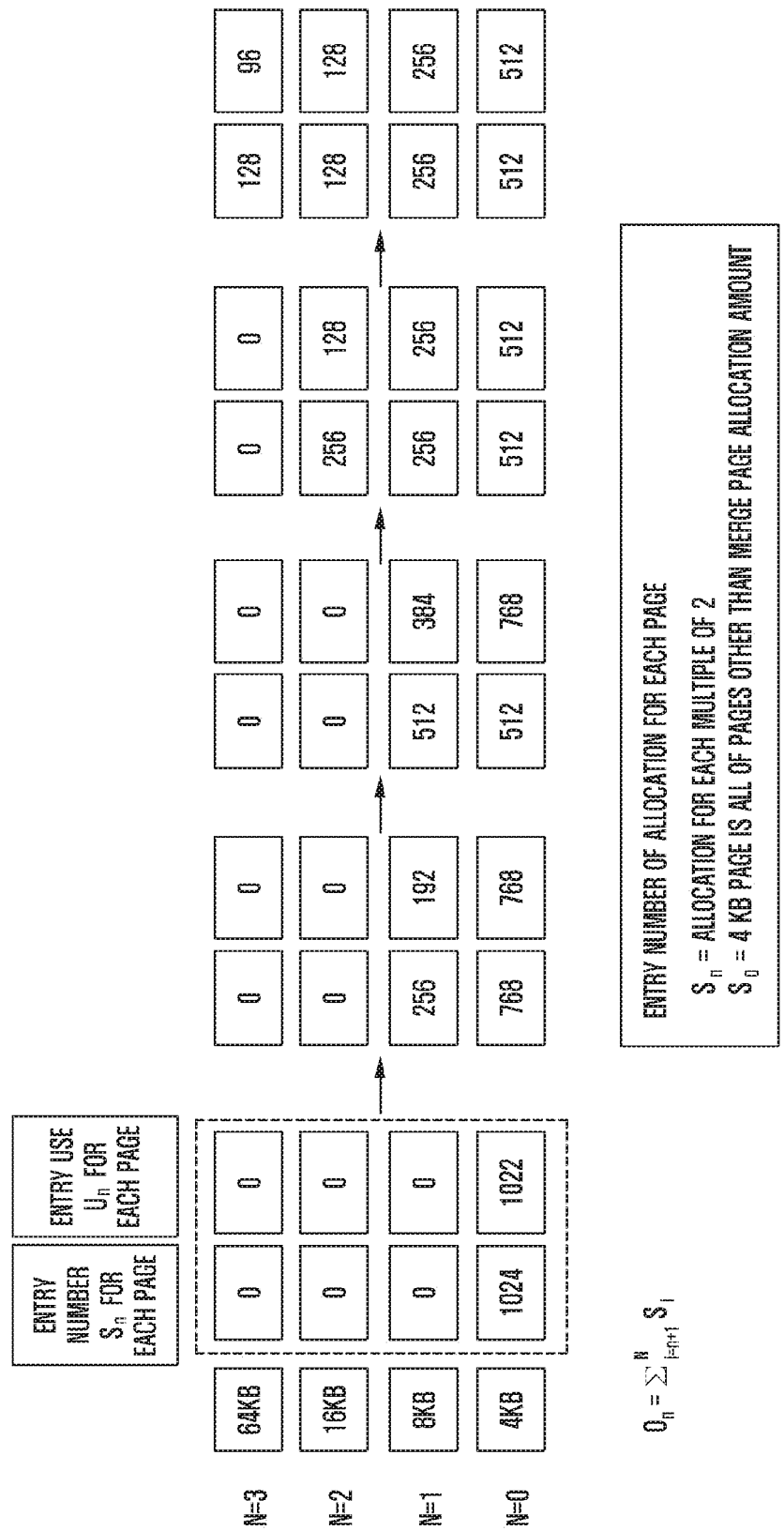
FIG. 10 is a diagram showing a usage monitor according to an embodiment of the present disclosure.

FIG. 10 is a diagram showing the usage monitor 841 according to an embodiment of the present disclosure. Specifically, FIG. 10 shows a change of usage for each monitored page size with respect to one way.

Meanwhile, the hit monitor 842 may monitor the hit rate of a merged entry. Specifically, the hit monitor 842 may monitor a hit rate according to the size of each page corresponding to the merged entry.

If the hit rate of the merged entry of a specific page size is low, the hit monitor 842 may not additionally allocate a region for storing the merged entry corresponding to the specific page size.

For example, if entries corresponding to a 64 KB page have been merged, but the hit rate of the merged entry is low, a region for storing the merged entry corresponding to the 64 KB page may be maintained to the least size.

FIG. 11 is a diagram showing the hit monitor 842 according to an embodiment of the present disclosure. The hit monitor 842 may be implemented as a hit count and an access count, and may be presented as many as types of a supported page size.

For example, if the MMU 800 supports a merged entry for two pages, a merged entry for four pages, a merged entry for eight pages, and a merged entry for sixteen pages, each hit monitor 842 may include four hit counts and four access counts.

Meanwhile, the merge monitor 843 monitors the ratio of entries merged by the TLB merger 811. For example, the merge monitor 843 may count the number of times that entries have been merged for each support page size.

Figure 12:
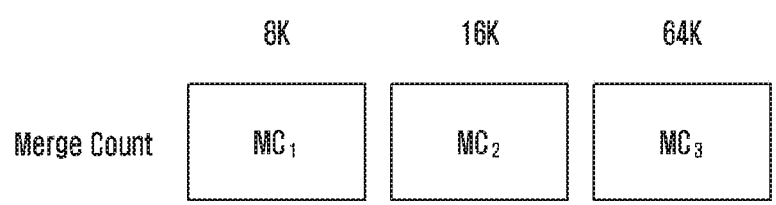
FIG. 12 is a diagram showing the structure of a merge monitor according to an embodiment of the present disclosure.

FIG. 12 shows the structure of the merge monitor 843 according to an embodiment of the present disclosure. A result monitored by the merge monitor 843 may be transmitted to the way selector 820.

Specifically, the allocation region for a merged entry corresponding to a page size may be increased with respect to a page size having a high number of times that entries have been merged depending on a result of the monitoring of the merge monitor 843.

Furthermore, a result of the monitoring of the merge monitor 843 may be used to determine the number of PTEs to be read if a TLB miss is generated with respect to a page size whose merged number is large.

When a TLB miss is generated, a case where the MMU 800 uses a method of reading information of four pages from DRAM is described as an example. In this case, if the merging of entries for eight pages is generated by a specific number or more, the MMU 800 may read information of every eight pages at a time.

Figure 13:
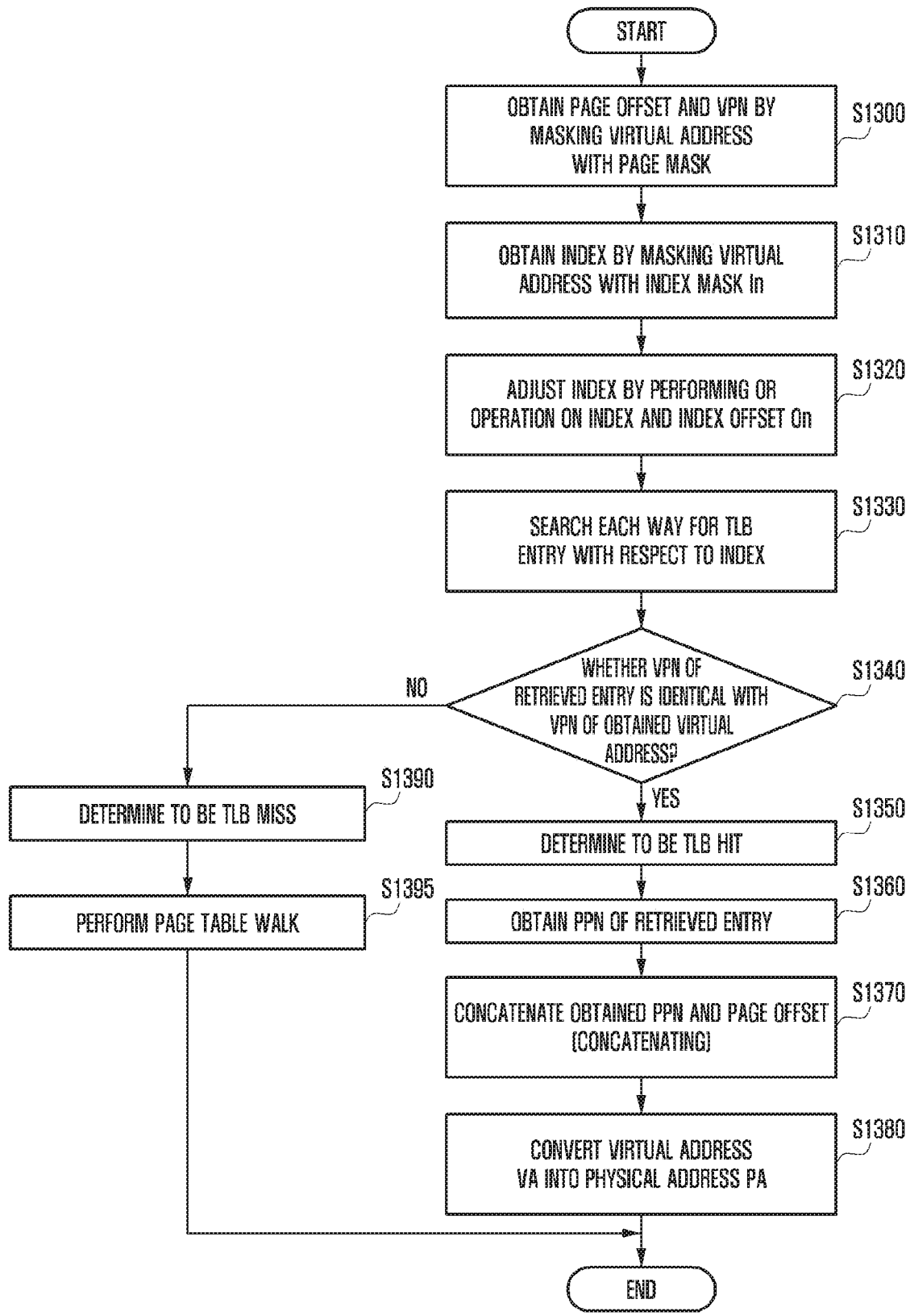
FIG. 13 is a flowchart showing a process of converting a virtual address into a physical address according to an embodiment of the present disclosure.

Meanwhile, FIG. 13 is a flowchart showing a process of converting a virtual address into a physical address according to an embodiment of the present disclosure.

First, at operation S1300, the MMU masks a virtual address with a page mask and obtains a page offset and a VPN. A page mask for performing masking on the virtual address may be determined by the way selector.

Operation S1300 may be performed in each way of a TLB. For example, the MMU may check the way selection bits of a virtual address in the way 0 of the TLB. Furthermore, the MMU may determine the location where the entry of a virtual address corresponding to the way selection bits has been stored in the way 0.

A VPN may be extracted by masking the virtual address based on the page size of entry stored in the determined location.

Furthermore, at operation S1310, the MMU may obtain an index by masking the virtual address with an index mask In. The index mask In for performing masking on the virtual address may be determined from the aforementioned masking table.

At operation S1320, the MMU may adjust the index by performing OR operation on the index and an index offset On. Furthermore, at operation S1330, the MMU may search each way for a TLB entry with respect to the index.

The aforementioned operation may be performed in at least one way included in the TLB at the same time.

At operation S1340, the MMU may determine whether the VPN of the retrieved entry is identical with the VPN of the virtual address obtained at operation S1300.

If the VPN of the retrieved entry is identical with the obtained VPN of the virtual address, the MMU may determine a TLB hit at operation S1350, and may obtain the PPN of the retrieved entry at operation S1360.

At operation S1380, the MMU may convert the virtual address VA into a physical address PA by concatenating the obtained PPN and the page offset at operation S1370.

Meanwhile, if the VPN of the retrieved entry is not the same as the obtained VPN of the virtual address at operation S1340, specifically, if the VPN of the retrieved entry is not the same as the obtained VPN of the virtual address in all of ways on which the above operations have been performed, the MMU may proceed to operation S1390.

The MMU may determine a TLB miss at operation S1390, and may perform a page table walk at operation S1395. For example, the MMU may search the page table of outside memory, such as the DRAM, for a PPN mapped to the VPN.

The MMU can efficiently convert a virtual address of a memory page into a physical address while using an entry in which a limited number of virtual addresses and physical addresses have been mapped without changing the size of the memory page according to the aforementioned method.

Figure 14:
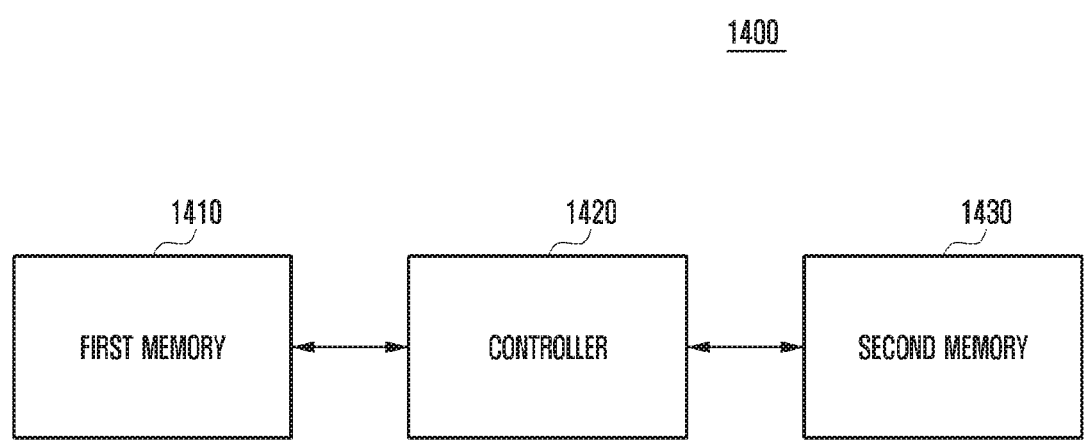
FIG. 14 is a block diagram showing the elements of the electronic device according to an embodiment of the present disclosure.

Meanwhile, FIG. 14 is a block diagram showing the elements of an electronic device according to an embodiment of the present disclosure. The electronic device 1400 may include first memory 1410, a controller 1420 and second memory 1430.

The electronic device 1400 may be implemented as a memory management unit (MMU). The first memory 1410 may be implemented as a translation lookaside buffer (TLB). According to an embodiment, the first memory 1410 may be located within the controller 1420.

Furthermore, the second memory 1430 may be implemented as the DRAM.

The controller 1420 is an element for generally controlling the electronic device 1400. The controller 1420 may determine whether a physical address mapped to a virtual address is consecutive with respect to at least two entries that belong to a plurality of entries in which virtual addresses and physical addresses have been mapped and that include a consecutive virtual address. Furthermore, if, as a result of the determination, the physical addresses of the at least two entries are consecutive, the controller 1420 may merge entries in which the virtual address and the physical address are consecutive into one entry.

The controller 1420 may store the merged entry in the first memory 1410.

Meanwhile, if it is necessary to convert the virtual address into the physical address, the controller 1420 may search whether the virtual address and the physical address mapped to the virtual address are stored in the first memory.

Furthermore, if, as a result of the search, information about the virtual address has not been stored in the first memory 1410, the controller 1420 may determine whether the physical addresses of a plurality of consecutive page table entries (PTE) are consecutive with respect to the plurality of consecutive PTEs stored in the second memory 1430.

If the physical addresses are consecutive, the controller 1420 may merge the plurality of consecutive PTEs into one entry.

Furthermore, the controller 1420 may store the merged entry into the first memory 1410.

Meanwhile, the controller 1420 may search entries stored in the first memory 1410 for a first virtual address, that is, the virtual address of the most recently used entry.

Furthermore, the controller 1420 may search for a second virtual address, that is, a virtual address consecutive to the first virtual address, and may determine whether a second physical address mapped to the second virtual address is consecutive to a first physical address mapped to the first virtual address in the first memory.

If, as a result of the determination, the first physical address and the second physical address are consecutive, the controller 1420 may merge an entry for the first virtual address and an entry for the second virtual address into one entry.

Meanwhile, the controller 1420 may determine a storage location on the first memory based on the specific bits of the virtual address included in the merged entry and the size of a page for the merged entry. Furthermore, the controller 1420 may store the merged entry in the determined location.

The controller 1420 may identify the ratio of the size of a page for each of a plurality of merge entries stored in the first memory, and may control the size of a region stored in the first memory 1410 according to the size of a page indicated by the merge entry based on the ratio.

Meanwhile, if a storage region corresponding to the page size for the merged entry has not been previously stored in the first memory 1410, the controller 1420 may set the storage region corresponding to the size of a page for the merged entry in the first memory 1410. Furthermore, the controller may store the merged entry in the set region.

Furthermore, if it is necessary to convert the virtual address into the physical address, the controller 1420 may determine a search location within the first memory using the specific bits included in the virtual address. The controller 1420 may search an entry corresponding to the virtual address based on the size of a page predetermined with respect to the search location.

Meanwhile, the first memory 1410 is a translation lookaside buffer (TLB), and the TLB may include a plurality of ways.

Accordingly, the controller 1420 may store the merged entry in one region of the plurality of ways based on the size of a page for the merged entry.

Meanwhile, the controller 1420 may receive a virtual address on which address conversion is to be performed through a transceiver. Furthermore, the controller 1420 may Check specific bits of the virtual address, and may determine the location where an entry according to the checked specific bits has been stored in the first memory. The controller 1420 may determine whether an entry corresponding to the virtual address has been stored at the determined location. The controller may convert the virtual address into a physical address based on a result of the determination.

If, as a result of the determination, the entry corresponding to the virtual address has not been stored at the determined location, the controller 1420 may search a plurality of consecutive page table entries (PTE) stored in the second memory for the entry corresponding to the virtual address. Furthermore, the controller 1420 may convert the virtual address into a physical address based on a result of the search.

Meanwhile, the elements of the aforementioned electronic device may be implemented in the form of software. For example, the controller of the electronic device may further include flash memory or other non-volatile memory. Programs for performing the respective functions of the MMU or a controller controlling the MMU may be stored in the non-volatile memory.

Furthermore, the controller of the electronic device may be implemented in a form including a CPU and random access memory (RAM). The CPU of the controller may copy the aforementioned programs stored in the non-volatile memory to the RAM, and then may perform functions of the electronic device, such as those described above, by executing the copied programs.

The controller is an element responsible for control of the electronic device. The controller may be interchangeably used as the same meaning, such as a central processing unit, a micro processor, a controller, a processor or an operating system. Furthermore, the controller of the electronic device may be implemented as a system-on-a-chip (or system on chip or SOC or SoC) along with other functions units, such as a communication module included in the electronic device.

Meanwhile, the method for the electronic device to manage memory according to the aforementioned various embodiments may be coded in software and stored in a non-transitory readable medium. The non-transitory readable medium may be mounted on various devices and used.

The non-transitory readable medium does not mean a medium that stores data for a short time, such as a register, a cache or memory, but means a medium that stores data semi-permanently and that can be read by a device. Specifically, the non-transitory readable medium may be a CD, a DVD, a hard disk, a Blueray disk, a USB, a memory card or ROM.

Furthermore, although the preferred embodiments of the present disclosure have been illustrated and described above, the present disclosure is not limited to the aforementioned specific embodiments, and a person having ordinary skill in the aft to which the present disclosure pertains may modify the present disclosure in various ways without departing from the gist of the present disclosure in the claims. Such modified embodiments should not be individually understood from the technical spirit or prospect of this specification.

The invention claimed is:

1. A method for an electronic device to manage memory, comprising:
    determining whether at least two virtual addresses are contiguous, from a plurality of entries;
    determining whether at least two physical addresses mapped to the at least two virtual addresses are contiguous, in case that the at least two virtual addresses are contiguous;
    merging at least two entries in which the virtual address and the physical address are consecutive into one merged entry, in case that the at least two physical addresses are contiguous, the merged entry including a specific bit; and
    storing the merged entry in a first memory comprising a plurality of ways, the merged entry comprising information indicating a number of entries being merged,
    wherein a location, where the merged entry is stored, is determined at a way of the plurality of ways based on the specific bit and the information indicating the number of entries being merged.

2. The method of claim 1, further comprising:
    searching whether the virtual address and the physical address mapped to the virtual address are stored in the first memory, in case that the virtual address needs to be converted into the physical address;
    determining whether physical addresses of a plurality of consecutive page table entries (PTE) stored in a second memory are consecutive with respect to the plurality of consecutive PTEs, in case that information about the virtual address has not been stored in the first memory;
    merging the plurality of consecutive PTEs into one merged entry, in case that the physical addresses are consecutive; and
    storing the merged entry in the first memory.

3. The method of claim 1, further comprising:
    searching the first memory for a first virtual address which is a virtual address of a most recently used entry;
    searching for a second virtual address which is a virtual address consecutive to the first virtual address;

determining whether a second physical address mapped to the second virtual address is consecutive to a first physical address mapped to the first virtual address in the first memory; and merging an entry for the first virtual address and an entry for the second virtual address into one merged entry, in case that the first physical address and the second physical address are consecutive, wherein the storing of the merged entry further comprises:
determining a storage location on the first memory based on the specific bit of the virtual address included in the merged entry and a size of a page for the merged entry; and storing the merged entry in the determined location.

4. The method of claim 3, further comprising:
identifying a ratio of a size of a page for each of a plurality of merge entries stored in the first memory;
controlling a size of a region stored in the first memory according to the size of a page indicated by the merge entry based on the ratio;
setting a storage region corresponding to the size of a page for the merged entry in the first memory in case that the storage region corresponding to the size of the page for the merged entry has not been previously stored in the first memory; and
storing the merged entry in the set region.

5. The method of claim 3, further comprising:
determining a search location within the first memory using the specific bit included in the virtual address in case that the virtual address needs to be converted into the physical address; and
accessing an entry corresponding to the virtual address based on a size of a page predetermined with respect to the search location,
wherein the first memory is a translation lookaside buffer (TLB), and
the storing of the merged entry comprises storing the merged entry in one region of the plurality of ways based on the size of a page for the merged entry.

6. The method of claim 1, further comprising:
receiving a virtual address for address conversion;
identifying the specific bit of the virtual address;
determining a location where an entry according to the identified specific bit has been stored in the first memory;
determining whether an entry corresponding to the virtual address has been stored at the determined location; and
converting the virtual address into a physical address based on a result of the determination,
wherein the converting of the virtual address further comprises:
searching a plurality of consecutive page table entries (PTE) stored in a second memory for the entry corresponding to the virtual address in case that the entry corresponding to the virtual address has not been stored at the determined location; and
converting the virtual address into the physical address based on a result of the search.

7. An electronic device, comprising:
a first memory; and
a controller configured to determine whether at least two virtual addresses are contiguous, from a plurality of entries, determine whether at least two physical addresses mapped to the at least two virtual addresses are contiguous, in case that the at least two virtual addresses are contiguous, merge at least two entries in which the virtual address and the physical address are consecutive into one merged entry, in case that the at least two physical addresses are contiguous, the merged entry including a specific bit, and store the merged entry in the first memory comprising a plurality of ways, the merged entry comprising information indicating a number of entries being merged,
wherein a location, where the merged entry is stored, is determined at a way of the plurality of ways based on the specific bit and the information indicating the number of entries being merged.

8. The electronic device of claim 7, further comprising a second memory,
wherein the controller is configured to search whether the virtual address and the physical address mapped to the virtual address are stored in the first memory in case that the virtual address needs to be converted into the physical address, to determine whether physical addresses of a plurality of consecutive page table entries (PTE) stored in the second memory are consecutive with respect to the plurality of consecutive PTEs, in case that information about the virtual address has not been stored in the first memory, to merge the plurality of consecutive PTEs into one merged entry, in case that the physical addresses are consecutive, and to store the merged entry in the first memory.

9. The electronic device of claim 7, wherein the controller is configured to search the first memory for a first virtual address which is a virtual address of a most recently used entry, to search for a second virtual address which is a virtual address consecutive to the first virtual address, to determine whether a second physical address mapped to the second virtual address is consecutive to a first physical address mapped to the first virtual address in the first memory, and to merge an entry for the first virtual address and an entry for the second virtual address into one merged entry, in case that the first physical address and the second physical address are consecutive.

10. The electronic device of claim 7, wherein the controller is configured to determine a storage location on the first memory based on the specific bit of the virtual address included in the merged entry and a size of a page for the merged entry and to store the merged entry in the determined location.

11. The electronic device of claim 8, wherein the controller is configured to identify a ratio of a size of a page for each of a plurality of merge entries stored in the first memory and to control a size of a region stored in the first memory according to the size of a page indicated by the merge entry based on the ratio.

12. The electronic device of claim 9, wherein the controller is configured to set a storage region corresponding to the size of a page for the merged entry in the first memory in case that the storage region corresponding to the size of the page for the merged entry has not been previously stored in the first memory and to store the merged entry in the set region.

13. The electronic device of claim 10, wherein:
the controller is configured to determine a search location within the first memory using the specific bit included in the virtual address in case that the virtual address needs to be converted into the physical address and to access an entry corresponding to the virtual address based on a size of a page predetermined with respect to the search location,
the first memory is a translation lookaside buffer (TLB), and the controller is configured to store the merge entry in one region of the plurality of ways based on the size of a page for the merged entry.

14. The electronic device of claim 7, further comprising a transceiver,
wherein the controller is configured to receive a virtual address on which address conversion is to be performed through the transceiver, to determine a location where an entry according to the identified specific bit has been stored in the first memory by identifying specific bit of the virtual address, to determine whether an entry corresponding to the virtual address has been stored at the determined location, and to convert the virtual address into a physical address based on a result of the determination.

15. The electronic device of claim 8, further comprising a second memory,
wherein the controller is configured to search a plurality of consecutive page table entries (PTE) stored in the second memory for the entry corresponding to the virtual address, in case that the entry corresponding to the virtual address has not been stored at the determined location and to convert the virtual address into the physical address based on a result of the search.

* * * * *